(12) United States Patent
Childress

(10) Patent No.: US 7,095,426 B1
(45) Date of Patent: Aug. 22, 2006

(54) GRAPHICAL USER INTERFACE WITH A HIDE/SHOW FEATURE FOR A REFERENCE SYSTEM IN AN INSURANCE CLAIMS PROCESSING SYSTEM

(75) Inventor: Allen B. Childress, Baytown, TX (US)

(73) Assignee: Computer Sciences Corporation, Austin, TX (US)

( * ) Notice: Subject to any disclaimer, the term of this patent is extended or adjusted under 35 U.S.C. 154(b) by 850 days.

(21) Appl. No.: 09/602,691

(22) Filed: Jun. 23, 2000

(51) Int. Cl.
*G09G 5/00* (2006.01)

(52) U.S. Cl. ...................................... 345/794; 345/708
(58) Field of Classification Search ................ 345/797, 345/796, 795, 794, 791, 792–793, 705, 706, 345/707, 708, 709–712, 713, 714–715, 765–767, 345/703, 815, 816, 828–830; 707/101, 102, 707/10, 3; 709/230; 705/38, 39, 35, 42
See application file for complete search history.

(56) References Cited

U.S. PATENT DOCUMENTS

| 4,553,206 A | 11/1985 | Smutek et al. |
| 4,812,966 A | 3/1989 | Takagi et al. |

(Continued)

FOREIGN PATENT DOCUMENTS

| EP | 0 280 773 | 9/1988 |
| EP | 0 465 018 | 1/1992 |
| EP | 0 926 608 | 6/1999 |
| JP | 2002014950 A | * 1/2002 |

OTHER PUBLICATIONS www.foremost.com/secure/fm—claims,htm, 1996.*

(Continued)

*Primary Examiner*—Steven Sax
(74) *Attorney, Agent, or Firm*—Meyertons, Hood, Kivlin, Kowert & Goetzel, P.C.; Eric B. Meyertons

(57) ABSTRACT

An improved method and system for providing context-sensitive help and interactive search capability in an insurance claims processing system. A help information database may include one or more index tables, one or more header tables and one or more text tables. In one embodiment, the context-sensitive help for a step in processing an insurance claim may be automatically invoked when entering the step. Alternatively, the user may interactively invoke context-sensitive help once the step is displayed. The insurance claims processing system may search one or more index tables for entries including a page ID and/or codes from one or more elements of the page. The insurance claims processing system may locate one or more entries in the one or more index tables and then locate entries in the one or more help tables using information from the entries located in the one or more index tables. The insurance claims processing system may then display information from the located help table entries in order of relevance. A search interface may also be provided by the insurance claims processing system. A user may enter one or more terms to be searched for in the help database. The insurance claims processing system may then search for and locate one or more entries in the one or more index tables that include at least one of the one or more terms. The located entries in the index table may then be used to locate help entries in the one or more help tables that include at least one of the one or more terms. The insurance claims processing system may then display information from the located help table entries in order of relevance.

30 Claims, 16 Drawing Sheets

U.S. PATENT DOCUMENTS

| | | |
|---|---|---|
| 4,831,526 A | 5/1989 | Luchs et al. |
| 4,837,693 A | 6/1989 | Schotz |
| 4,878,167 A | 10/1989 | Kapulka et al. |
| 4,975,840 A | 12/1990 | DeTore et al. |
| 4,987,538 A | 1/1991 | Johnson et al. |
| 4,992,972 A | 2/1991 | Brooks et al. |
| 5,093,911 A | 3/1992 | Parks et al. |
| 5,099,422 A | 3/1992 | Foresman et al. |
| 5,155,806 A | 10/1992 | Hoeber et al. |
| 5,157,768 A | 10/1992 | Hoeber et al. |
| 5,191,522 A | 3/1993 | Bosco et al. |
| 5,201,044 A | 4/1993 | Frey, Jr. et al. |
| 5,233,513 A | 8/1993 | Doyle |
| 5,241,671 A | 8/1993 | Reed et al. |
| 5,287,448 A | 2/1994 | Nicol et al. |
| 5,307,262 A | 4/1994 | Ertel |
| 5,307,265 A | 4/1994 | Winans |
| 5,386,566 A | 1/1995 | Hamanaka et al. |
| 5,394,555 A | 2/1995 | Hunter et al. |
| 5,432,904 A | 7/1995 | Wong |
| 5,434,994 A | 7/1995 | Shaheen et al. |
| 5,446,653 A | 8/1995 | Miller et al. |
| 5,455,947 A | 10/1995 | Suzuki et al. |
| 5,471,575 A | 11/1995 | Giansante |
| 5,481,667 A | 1/1996 | Bieniek et al. |
| 5,483,632 A | 1/1996 | Kuwamoto et al. |
| 5,499,330 A | 3/1996 | Lucas et al. |
| 5,504,674 A | 4/1996 | Chen et al. |
| 5,504,675 A | 4/1996 | Cragun et al. |
| 5,517,405 A | 5/1996 | McAndrew et al. |
| 5,523,942 A | 6/1996 | Tyler et al. |
| 5,535,323 A | 7/1996 | Miller et al. |
| 5,537,315 A | 7/1996 | Mitcham |
| 5,550,734 A | 8/1996 | Tarter et al. |
| 5,550,976 A | 8/1996 | Henderson et al. |
| 5,557,515 A | 9/1996 | Abbruzzese et al. |
| 5,586,310 A | 12/1996 | Sharman |
| 5,613,072 A | 3/1997 | Hammond et al. |
| 5,638,508 A | 6/1997 | Kanai et al. |
| 5,644,778 A | 7/1997 | Burks et al. |
| 5,652,842 A | 7/1997 | Siegrist, Jr. et al. |
| 5,655,085 A | 8/1997 | Ryan et al. |
| 5,673,402 A | 9/1997 | Ryan et al. |
| 5,689,706 A | 11/1997 | Rao et al. |
| 5,704,044 A | 12/1997 | Tarter et al. |
| 5,717,913 A | 2/1998 | Driscoll |
| 5,732,221 A | 3/1998 | Feldon et al. |
| 5,732,397 A | 3/1998 | DeTore et al. |
| 5,745,901 A | 4/1998 | Entner et al. |
| 5,748,953 A | 5/1998 | Mizutani et al. |
| 5,768,505 A | 6/1998 | Gilchrist et al. |
| 5,768,506 A | 6/1998 | Randell |
| 5,768,578 A | 6/1998 | Kirk et al. |
| 5,797,134 A | 8/1998 | McMillan et al. |
| 5,832,481 A | 11/1998 | Sheffield |
| 5,832,530 A | 11/1998 | Paknad et al. |
| 5,835,897 A | 11/1998 | Dang |
| 5,835,914 A | 11/1998 | Brim |
| 5,850,442 A | 12/1998 | Muftic |
| 5,870,711 A | 2/1999 | Huffman |
| 5,873,066 A | 2/1999 | Underwood et al. |
| 5,884,274 A | 3/1999 | Walker et al. |
| 5,895,461 A | 4/1999 | De La Huerga et al. |
| 5,899,998 A | 5/1999 | McGauley et al. |
| 5,903,873 A | 5/1999 | Peterson et al. |
| 5,907,848 A | 5/1999 | Zaiken et al. |
| 5,909,683 A | 6/1999 | Miginiac |
| 5,913,198 A | 6/1999 | Banks |
| 5,915,241 A | 6/1999 | Giannini |
| 5,918,208 A | 6/1999 | Javitt |
| 5,930,759 A | 7/1999 | Moore et al. |
| 5,933,816 A | 8/1999 | Zeanah et al. |
| 5,937,189 A | 8/1999 | Branson |
| 5,950,169 A | 9/1999 | Borghesi et al. |
| 5,950,196 A | 9/1999 | Pyreddy et al. |
| 5,956,687 A * | 9/1999 | Wamsley et al. ............... 705/1 |
| 5,956,691 A | 9/1999 | Powers |
| 5,970,464 A | 10/1999 | Apte et al. |
| 5,987,434 A | 11/1999 | Libman |
| 5,991,733 A * | 11/1999 | Aleia et al. .................... 705/8 |
| 5,991,756 A | 11/1999 | Wu |
| 5,995,947 A | 11/1999 | Fraser et al. |
| 5,999,940 A | 12/1999 | Ranger |
| 6,012,053 A | 1/2000 | Pant et al. |
| 6,016,504 A | 1/2000 | Arnold et al. |
| 6,029,150 A | 2/2000 | Kravitz |
| 6,029,195 A | 2/2000 | Herz |
| 6,038,393 A | 3/2000 | Iyengar et al. |
| 6,038,668 A | 3/2000 | Chipman et al. |
| 6,049,665 A | 4/2000 | Branson et al. |
| 6,061,657 A | 5/2000 | Whiting-O'Keefe |
| 6,064,983 A | 5/2000 | Koehler |
| 6,065,000 A | 5/2000 | Jensen |
| 6,065,047 A * | 5/2000 | Carpenter et al. .......... 709/218 |
| 6,073,104 A * | 6/2000 | Field ............................ 705/1 |
| 6,081,832 A | 6/2000 | Gilchrist et al. |
| 6,088,710 A | 7/2000 | Dreyer et al. |
| 6,092,049 A | 7/2000 | Chislenko et al. |
| 6,098,070 A | 8/2000 | Maxwell |
| 6,105,007 A | 8/2000 | Norris |
| 6,112,986 A * | 9/2000 | Berger et al. ................ 235/380 |
| 6,115,690 A | 9/2000 | Wong |
| 6,119,093 A | 9/2000 | Walker et al. |
| 6,128,598 A | 10/2000 | Walker et al. |
| 6,134,582 A | 10/2000 | Kennedy |
| 6,148,297 A | 11/2000 | Swor et al. |
| 6,163,770 A | 12/2000 | Gamble et al. |
| 6,185,540 B1 | 2/2001 | Schreitmueller et al. |
| 6,202,054 B1 | 3/2001 | Lawlor et al. |
| 6,208,973 B1 | 3/2001 | Boyer et al. |
| 6,226,623 B1 | 5/2001 | Schein et al. |
| 6,236,972 B1 | 5/2001 | Shkedy |
| 6,236,975 B1 | 5/2001 | Boe et al. |
| 6,237,035 B1 | 5/2001 | Himmel et al. |
| 6,239,798 B1 * | 5/2001 | Ludolph et al. ............. 345/794 |
| 6,266,645 B1 | 7/2001 | Simpson |
| 6,272,471 B1 | 8/2001 | Segal |
| 6,272,482 B1 | 8/2001 | McKee et al. |
| 6,272,528 B1 | 8/2001 | Cullen et al. |
| 6,330,551 B1 | 12/2001 | Burchetta et al. |
| 6,336,096 B1 | 1/2002 | Jernberg |
| 6,341,265 B1 | 1/2002 | Provost et al. |
| 6,343,271 B1 | 1/2002 | Peterson et al. |
| 6,370,511 B1 | 4/2002 | Dang |
| 6,401,079 B1 | 6/2002 | Kahn et al. |
| 6,456,303 B1 * | 9/2002 | Walden et al. ............... 345/705 |
| 6,477,533 B1 | 11/2002 | Schiff et al. |
| 6,480,956 B1 * | 11/2002 | DiRienzo ..................... 713/150 |
| 6,484,178 B1 * | 11/2002 | Bence, Jr. et al. ........... 707/101 |
| 6,609,200 B1 * | 8/2003 | Anderson et al. ........... 713/176 |
| 6,636,242 B1 * | 10/2003 | Bowman-Amuah ......... 715/764 |
| 6,810,382 B1 * | 10/2004 | Wamsley et al. ............. 705/1 |
| 2002/0022976 A1 | 2/2001 | Hartigan |
| 2002/0002475 A1 | 1/2002 | Freedman et al. |
| 2002/0116228 A1 | 8/2002 | Bauer et al. |
| 2002/0147617 A1 | 10/2002 | Schoenbaum et al. |

OTHER PUBLICATIONS

Microsoft Press Computer Dictionary 2nd Edition, Microsoft Press, Redmond WA, 1994.

"High–Performance Communication Networks", Jean Walrand and Pravin Varaiya; 1996; pp. 361–369; Morgan–Kaufman Publishers.

"Will your Business Model Float?"; Baatz., C.B.; Webmaster Magazine; Oct. 1996; http://www.cio.com/archive/web-business/100196‾float‾content.html.

"InsWeb Teams Up with Online Resources; Deal brings online insurance Marketplace to hundreds of financial Institutions"; Dec. 2, 1998; pp. 1–3; Business Wire.

"Reliance Group providing On–Line Access to Workers'Comp, Auto, Surety, Professional Liability Coverages; E–Commerce to Exceed $100 Million in 1998"; Dec. 7, 1999; pp. 1–3; Business Wire.

Banking Flows Onto Net, Two Austin Software Companies Poised for Boom in Online Service; Ladendorf, Kirk; Dec. 14, 1998; pp. 1–5; Austin American Statesman.

"Time and Billing Gets Webbed"; Antoinette, Alexander; Jun. 1, 2000; pp. 46–50; Accounting Technology, vol. 16, No. 5.

Utzschneider, "Microsoft Transaction Server and Internet Information Server: Technology for the Web," Feb. 6, 1998, pp. 1–6.

Microsoft Corporation, "Holding State in Objects with Microsoft Transaction Server," Jun. 1997, pp. 1–3.

Microsoft Corporation, "Microsoft Component Services, Server Operating System, A Technology Overview," Aug. 15, 1998, pp. 1–7.

"@ Fault A Commitment to Consistency," Computer Sciences Corporation, Copyright 2000, pp. 1–2.

"The OTC Revolution"; Juhl, Randy; Mar. 3, 1997; Drug Topics 141 (5).

Borland, Russel; "Running Microsoft Outlook 97," Microsoft Press, 1997.

Medisoft Insurance Claims Software Website. May 10, 2000. [Retrieved on Jan. 10, 2003] Retrieved from Internet. URL: http://web.archive.org/web/20000510094549/http://www/medisoft.com/.

Merlin, Jr., William F., "Collision Course With the Colossus Program: How To Deal With It," The Merlin Law Group, May 2000, Tampa, Fl., pp. 1–17.

Microsoft Press Computer Dictionary 2nd Edition, Microsoft Press, Redmond WA., 1994.

Merlin, Jr., William F., "Overcoming Allstate's Trade Secrets and Work–Product Objections," The Merlin Law Group, May 2000, Tampa, Fl., pp. 1–31.

Scopus and Entrust Technologies to Deliver World's First Secure Customer Care Solution for the Financial Service Market, PR Newswire, Nov. 5, 1997.

Howarth, "Outsourcing: Technology on Tap," Business Review Weekly, Dec. 1999, pp. 1–5.

Mead, Jay, "Measuring the Value Added by Technical Documentation" Techical Communication Online, Aug. 1998, V. 45, N. 3.

Summary of Colossus Functionality as of Dec. 1999.

Continuum Connections, vol. I, No. 1, The Continuum Company, Inc., Nov. 1991.

Continuum Connections, vol. I, No. 2, The Continuum Company, Inc., Jan./Feb. 1992.

Continuum Connections, vol. I, No. 3, The Continuum Company, Inc., Mar./Apr. 1992.

Continuum Connections, vol. I, No. 4, The Continuum Company, Inc., Jul./Aug. 1992.

Continuum Connections, vol. II, No. 1, The Continuum Company, Inc., Oct./Nov. 1992.

Continuum Connections, vol. II, No. 2, The Continuum Company, Inc., Dec./Jan. 1993.

Continuum Connections, vol. II, No. 3, The Continuum Company, Inc., Mar./Apr. 1993.

Continuum Connections, vol. II, No. 4, The Continuum Company, Inc., Jul./Aug. 1993.

Continuum Connections, vol. II No. 5, The Continuum Company, Inc., Nov./Dec. 1993.

Continuum Connections, vol. II, No. 6, The Continuum Company, Inc., Jan./Feb. 1994.

Continuum Connections, vol. III, No. 1, The Continuum Company, Inc., Mar./Apr. 1994.

Continuum Connections, vol. III, No. 2, The Continuum Company, Inc., Nov./Dec. 1994.

Continuum Connections, vol. III, No. 3, The Continuum Company, Inc., Mar./Apr. 1995.

Continuum Connections to the Americas, vol. 1, No. 1, The Continuum Company, Inc., Sep. 1995.

Continuum Connections vol. III, No. 4, The Continuum Company, Inc., Oct./Nov. 1995.

Continuum Connections to the Americas, vol. II, No. 1, The Continuum Company, Inc., Jan. 1996.

Continuum Connections to the Americas, vol. II, No. 2, The Continuum Company, Inc., Mar. 1996.

Continuum Connections to the Americas, vol. II, No. 3, The Continuum Company, Inc., May 1996.

Continuum Connections to the Americas, vol. II, No. 4, The Continuum Company, Inc., Jul. 1996.

Continuum Connections to the Americas, vol. II, No. 5, The Continuum Company, Inc., Sep. 1996.

Connections to the Americas, vol. III, No. 1, CSC Continuum Company, Inc., Jan. 1997.

Connections to the Americas, vol. III, No. 2, CSC Continuum, Feb. 1997.

Connections to the Americas, vol. III, No. 3, CSC Continuum, Mar. 1997.

Connections to the Americas, vol. III, No. 4, CSC Continuum, Apr. 1997.

Connections to the Americas, vol. III, No. 5, Computer Sciences Corporation, May/Jun. 1997.

Connnections to the Americas, vol. III, No. 6, Computer Sciences Corporation, Jul./Aug. 1997.

Connections to the Americas, vol. III, No. 7, Computer Sciences Corporation, Sep./Oct. 1997.

Connections to the Americas, vol. 4, No. 1, Computer Sciences Corporation, Jan. 1998.

Connections to the Americas, vol. 4, No. 2, Computer Sciences Corporation, Feb./Mar. 1998.

Connections to the Americas, vol. 4, No. 3, Computer Sciences Corporation, May/Jun. 1998.

Connections to the Americas, vol. 4, No. 4, Computer Sciences Corporation, Sep./Oct. 1998.

Insurance Connections, Computer Sciences Corporation, Feb./Mar. 1999.

Banking Connections, Computer Sciences Corporation, Apr./May 1999.

Insurance Connections, Computer Sciences Corporation, Jun./Jul. 1999.

Banking Connections, Computer Sciences Corporation, Aug./Sep. 1999.

Insurance Connections, Computer Sciences Corporation, Oct./Nov. 1999.

Cost Containment Products and Solutions for the Property and Casualty Insurance Industry, Computer Sciences Corporation, 1999.

Banking Connections, Computer Sciences Corporation, Dec. 1999.

Insurance Connections, Computer Sciences Corporation, Feb./Mar. 2000.

Banking Connections, Computer Sciences Corporation, Apr./May 2000.

Insurance Connections, Computer Sciences Corporation, Jun./Jul. 2000.

Insurance Connections, Computer Sciences Corporation, Sep./Oct. 2000.

Banking Connections, Computer Sciences Corporation, Nov./Dec. 2000.

"The Continuum Company Announces Colossus™ Licenses," Continuum Financial News Release, The Continuum Company, Inc., Apr. 7, 1995.

"The Continuum Company Announces Colossus License," Continuum Financial News Release, The Contiuum Company, Inc., Jul. 13, 1995.

"The Continuum Company Announces Colossus License," Continuum Financial News Release, The Continuum Company, Inc., Jul. 17, 1995.

"The Continuum Company Announces Colossus™ Sale," Continuum Financial News Release, The Continuum Company, Inc., Oct. 9, 1995.

"The Continuum Company Announces Colossus™ Sale To General Accident," Continuum Financial News Release, The Continuum Company, Inc., Nov. 7, 1995.

"The Continuum Company Announces Second European Colossus Sale," Continuum Financial News Release, The Continuum Company, Inc., Jan. 5, 1996.

"The Continuum Company Announces Colossus™ Sale," Continuum Financial News Release, The Continuum Company, Inc., Mar. 7, 1996.

"The Continuum Company Announces Colossus License," Continuum Financial News Release, The Continuum Company, Inc., May 9, 1996.

"The Continuum Company Announces Colossus Sale," Continuum Financial News Release, The Continuum Company, Inc., Jun. 12, 1996.

"The Continuum Company Announces Colossus Sale," Continuum Financial News Release, The Continuum Company, Inc., Jul. 3, 1996.

"CSC Continuum Announces Colossus Sale" News Release, Computer Sciences Corporation, Sep. 17, 1996.

"CSC Continuum Announces Colossus License," News Release, Computer Sciences Corporation, Sep. 17, 1996.

"CSC Continuum Announces COLOSSUS™ License," News Release, CSC Continuum, Nov. 21, 1996.

"USAA Licenses Colossus™" News Release, CSC Continuum, Feb. 10, 1997.

"20$^{th}$ Century Industries Licenses Colossus™, " News Release, CSC Continuum, Feb. 10, 1997.

"Arrow Claims Management Licenses COLOSSUS@, " News Release, Computer Sciences Corporation Aug. 6, 1997.

"American Family Insurance Renews COLOSSUS™ License," News Release, Computer Sciences Corporation, Dec. 8, 1997.

"Explorer Insurance Company Licenses COLOSSUS™, " News Release, Computer Sciences Corporation, Dec. 8, 1997.

* cited by examiner

Header Table

Text Table

| OBJECT ID | WORD | SOUNDEX | POSITION | TOTAL WORDS | WORD COUNT | RELEVANCE |
|---|---|---|---|---|---|---|
| 10101010000000001 | System | S235 | 5 | 54 | 0 | 0.31 |
| 10101010000000001 | System | S235 | 9 | 54 | 0 | 0.28 |
| 10101010000000002 | Anatomy | A535 | 15 | 86 | 0 | 0.28 |
| 10101010000000002 | Body | 0000 | 22 | 86 | 0 | 0.25 |
| 10101010000000002 | Consultation | C524 | 51 | 86 | 0 | 0.14 |
| 10101010000000000 | Consultation | C524 | 1 | 1 | 1 | 1.0 |
| 10102000000000000 | Anatomy | A535 | 3 | 3 | 1 | 0.55 |
| 10103000000000000 | Anatomy | A535 | 2 | 5 | 1 | 0.58 |
| 10101010100000000 | <Code 1> | 0000 | 2 | 3 | 1 | 0.62 |
| 10103000000000000 | <Code 2> | 0000 | 1 | 5 | 1 | 0.62 |
| 10101010000000001 | <Code 3> | 0000 | 1 | 54 | 0 | 0.33 |
| 10101010000000002 | <Code 4> | 0000 | 86 | 86 | 0 | 0.01 |
| .... | .... | .... | .... | .... | .... | .... |

140 → OBJECT ID
142 → WORD
144 → SOUNDEX
146 → POSITION
148 → TOTAL WORDS
150 → WORD COUNT
152 → RELEVANCE

FIG. 5
Index Table

GRAPHICAL USER INTERFACE WITH A HIDE/SHOW FEATURE FOR A REFERENCE SYSTEM IN AN INSURANCE CLAIMS PROCESSING SYSTEM

BACKGROUND OF THE INVENTION

1. Field of the Invention

The present invention generally relates to the field of insurance claims. More particularly, the present invention relates to a system and method for providing context-sensitive help and an interactive search mechanism at the various processing steps of an insurance claims processing system.

2. Description of the Related Art

Insurance companies have been processing and settling claims associated with bodily injury for a long time. The task of evaluating, analyzing or estimating the amount of damage associated with one or more types of bodily injuries, especially trauma-induced bodily injuries, can be very complex. Complexity in the evaluation process often arises out of the fact that concurrent expertise in legal, medical and insurance fields is often required to arrive at a particular decision involving a bodily injury claim.

Several factors can affect the estimated amount of the claim associated with a bodily injury. Every accident is different and every injury is unique. Arriving at a customized evaluation of a bodily injury claim, which is unique for a specific accident, injury, etc. is desirable. Applying across-the-board standards may tend to result in an inequitable solution for one or more parties involved. External environmental factors, such as the experience level of a claims adjuster, record of accomplishment of the legal professionals, post-injury quality of life for the injured party, etc., all can affect the valuation of a claim.

During the past several years, many insurance companies have been using computer-based and knowledge-based claim-processing systems to process, evaluate, analyze and estimate thousands of claims in a fair and consistent manner. A knowledge-based claim-processing system includes an expert system which utilizes and builds a knowledge base to assist the user in decision making. It may allow the insurance companies to define new rules and/or use previously defined rules, in real-time. The business rules are generally written by industry experts to evaluate legal, medical, insurance conditions before arriving at a valuation of a claim.

In knowledge-based systems, to estimate a claim for bodily injury, the user may enter inputs on a display screen and step through a series of displays or screens to complete the data input process. The knowledge-based claim processing system may then utilize the user-provided inputs to generate a claim report.

The complexity of analyzing or estimating the amount of damage associated with one or more types of bodily injuries may create difficulties to a user of the knowledge-based systems. Help information in the form of documents such as manuals and guidebooks may be provided by the knowledge-based systems to help the user in completing the data input process. The help information may be provided in printed form or, in some systems, in electronic form. The volume and complexity of the supplied help information may make it difficult for the user to locate a portion or portions of the information pertinent to a current step or screen that the user is working on in the data input process.

It may therefore be desirable to develop an electronic, on-line help system to provide context-sensitive help for the current step or screen that the user is working on in a knowledge-computer based system. It may also be desirable to provide a method for the user to interactively search the on-line help system for one or more terms relevant to the processing of a current claim. It may be desirable to display the context-sensitive help or occurrences of search terms to a portion of the display screen for the current step. It may also be desirable to provide an interface to the user to allow the user to interactively hide and/or show portions of the display screen containing context-sensitive help or search information.

SUMMARY OF THE INVENTION

The present invention provides various embodiments of a mechanism for providing context-sensitive help and the ability to interactively search a help database in insurance claims processing systems. One or more index tables may be provided for locating terms and codes for context-sensitive help and for interactively searching for terms in the help database. Each entry in the one or more index tables may represent an occurrence of a term or code in a document included in the help database for the insurance claims processing system. Examples of documents that may be included in the help database for the insurance claims processing system include, but are not limited to: medical journals, textbooks and/or manuals, insurance claims processing manuals or guidebooks, medical glossaries and/or dictionaries, and documents including context sensitive help entries for the insurance claims processing steps, and elements of the steps, in the insurance claims processing system.

An entry in the index table may include an object ID. The object ID may indicate a unique entry in a help information table in the help database. An entry in the index table may also include a term field. In one embodiment, a term field may include a term located in the one or more documents in the help database, or alternatively a term field may include a code representing a step or an element in a step in the insurance claims processing system. As used herein, a "term" may include one or more words, abbreviations, numerical values, or other types of alphanumeric strings that may appear in documents in an insurance claims processing help database. An entry in the index table may also include a Soundex field for locating words that are misspelled. In one embodiment, the entries in the index table may include a relevance value for the occurrence of the term in the help database. As used herein, the relevance of an occurrence of a term may be defined as the relevance of the term to the text object (header or text section) in which the occurrence is located.

In one embodiment, the help information database may include one or more header tables and one or more text tables. A header table may include a plurality of records, also referred to as entries, with one entry for each header element from the one or more documents to be included in the help database for the insurance claims processing system. Each entry may comprise a plurality of fields or elements. An index table may include a plurality of entries, with one entry for each text section from the one or more documents to be included in the help database for the insurance claims processing system. Each entry may comprise a plurality of fields or elements. In one embodiment, the fields may be substantially similar to the fields in embodiments of the header table.

An entry in a header or text table may include an object identifier (object ID). In one embodiment, the object ID for the entry may be unique in the help database. In one embodiment, the object ID may include information that may be used to identify the document including the entry, and the location in the document of the entry. In one embodiment, an entry may include the object identifier of the parent entry for the entry. An entry in a header or text table may also include fields with information on the location in the document of the entry. An entry in a header or text table may also include alphanumeric text from the document. When the entry is located during context sensitive help or a search, the alphanumeric text may be read from the entry and displayed on the display screen for a user to view. Alternatively, the entry may not store the actual text, but may instead include information for locating the text for the entry in the document. In this case, when the entry is located, the actual text for the entry may be read from the document itself and displayed for the user.

A user may initiate processing of an insurance claim in the insurance claims processing system. The insurance claims processing may begin at a first processing step, and may continue through a number of processing steps until the insurance claim processing is complete. A next processing step may be determined by user input at a current processing step, or alternatively may be predetermined (i.e. step B always follows step A). In one embodiment, a processing step may be divided into one or more screens or pages, wherein one screen or page at a time is displayed on display screen.

The insurance claims processing system may enter a processing step and display a page for the processing step. In one embodiment, the context-sensitive help for the step may be automatically invoked when entering the step. Alternatively, the user may interactively invoke context-sensitive help once the page is displayed. Context-sensitive help for each processing step may be unique, although some content may appear in the context-sensitive help for two or more processing steps. Context-sensitive help may also be unique for each of the one or more pages within a processing step. The page for the processing step may be displayed with the context-sensitive help for the page. In one embodiment, a display page may be divided into two or more panes, the context-sensitive help may be displayed in one or more panes on the page, and the processing step contents may appear in one or more panes on the page.

In one embodiment, each step or each page in a step in the insurance claims processing system may have a unique code, which may be referred to as a page ID. A page may also include one or more step elements that have associated codes. In one embodiment, step elements may include interface items that a user of the system interacts with in performing the step. In one embodiment, the step elements on the page may include system-supplied "answers" to questions posed to the user during the claims processing. In one embodiment, the step elements may include lists of injury codes selectable by the user. In one embodiment, the step elements may include lists of treatments for injuries selectable by the user.

The insurance claims processing system may search one or more index tables for entries including the page ID. The index table may also be searched for entries including the codes from one or more elements of the page. The search may result in the insurance claims processing system locating one or more entries in the one or more index tables. In one embodiment, there will be at least one entry located for the page ID in the one or more index tables. In one embodiment, if elements of the page have an associated code, there will be at least one entry located for each code in the one or more index tables. In one embodiment, each entry in the one or more index tables may indicate an occurrence in the one or more documents included in the help database for the insurance claims processing system of the page ID, code, or term included in the index table entry.

The insurance claims processing system may then locate entries in the one or more help tables using information from the entries located in the one or more index tables for the page ID and any elements of the page. The one or more help tables may be searched for occurrences of the object ID from each located entry in the index table.

In one embodiment, the insurance claims processing system may then rank the located help table entries by relevance value. The located help table entries may be ranked from highest relevance to lowest relevance. In one embodiment, the located help table entries may be listed without being ranked by relevance. In one embodiment, any entries found for a page code may be displayed at the top of the list regardless of the relevance ranking of the entry. Entries for other codes in the page may then be ranked below the page code entry or entries in order of relevance.

The insurance claims processing system may then display information from the located help table entries. In one embodiment, the entries may be displayed in the order of relevance of the entries. The help table entries may include portions of text from one or more documents related to insurance claims processing. Some help table entries may include section headers from the one or more documents. Some help table entries may include text from the bodies of sections of the one or more documents. Some help entries may include glossary information from the one or more documents. Other entries may include text from other portions of the one or more documents. In one embodiment, the relevance value may also be displayed.

The insurance claims processing system may also display information describing the location of the displayed portions of text in the one or more documents. This information may allow the user to look up (electronically or manually) located occurrences in the one or more documents.

In one embodiment, a search interface may be provided to the user of the insurance claims processing system. The user may enter in the search interface one or more terms to be searched for in the help database for the insurance claims processing system. The user may then initiate the search for the one or more terms. The insurance claims processing system may then search the one or more index tables for entries including at least one of the one or more terms. The insurance claims processing system may locate one or more entries in the one or more index tables that include at least one of the one or more terms. The located entries in the index table may be used to locate help entries in the one or more help tables that include at least one of the one or more terms. The one or more help tables may be searched for occurrences of the object ID from each of the located entries.

The located help table entries may be ranked by relevance. The located help table entries may be ranked from highest relevance to lowest relevance. In one embodiment, when there are more than one terms being searched for, located entries may be first ranked on the number of search terms the entries include. Entries that include more search terms may be ranked higher than entries with fewer search terms. The entries within the ranking categories may then be ranked by relevance within the category. Thus, entries with lower relevance, but more search terms, may appear higher in the overall ranking than entries with higher relevance, but fewer search terms.

The insurance claims processing system may then display information from the located help table entries. In one embodiment, the entries may be displayed in the order of relevance of the entries. The help table entries may include portions of text from one or more documents related to insurance claims processing. Some help table entries may include section headers from the one or more documents. Some help table entries may include text from the bodies of sections of the one or more documents. Some help entries may include glossary information from the one or more documents. Other entries may include text from other portions of the one or more documents. In one embodiment, the relevance value may also be displayed.

The insurance claims processing system may also display information describing the location of the displayed portions of text in the one or more documents. This information may allow the user to look up (electronically or manually) located occurrences in the one or more documents.

An interface item or items may be provided to the user for hiding or showing one or more panes displaying portions of the search results or context-sensitive help. In one embodiment, the interface items may be items displayed graphically on the screen (for example, icons) and may be selectable using input/output devices such as a mouse, joystick, or arrow keys on a keyboard. Interface items may also be keyboard selections such as function keys or key combinations.

BRIEF DESCRIPTION OF THE DRAWINGS

FIG. 5 illustrates an index table including terms and codes and cross-references to other tables according to one embodiment of an insurance claim processing system;

Figure 1A:
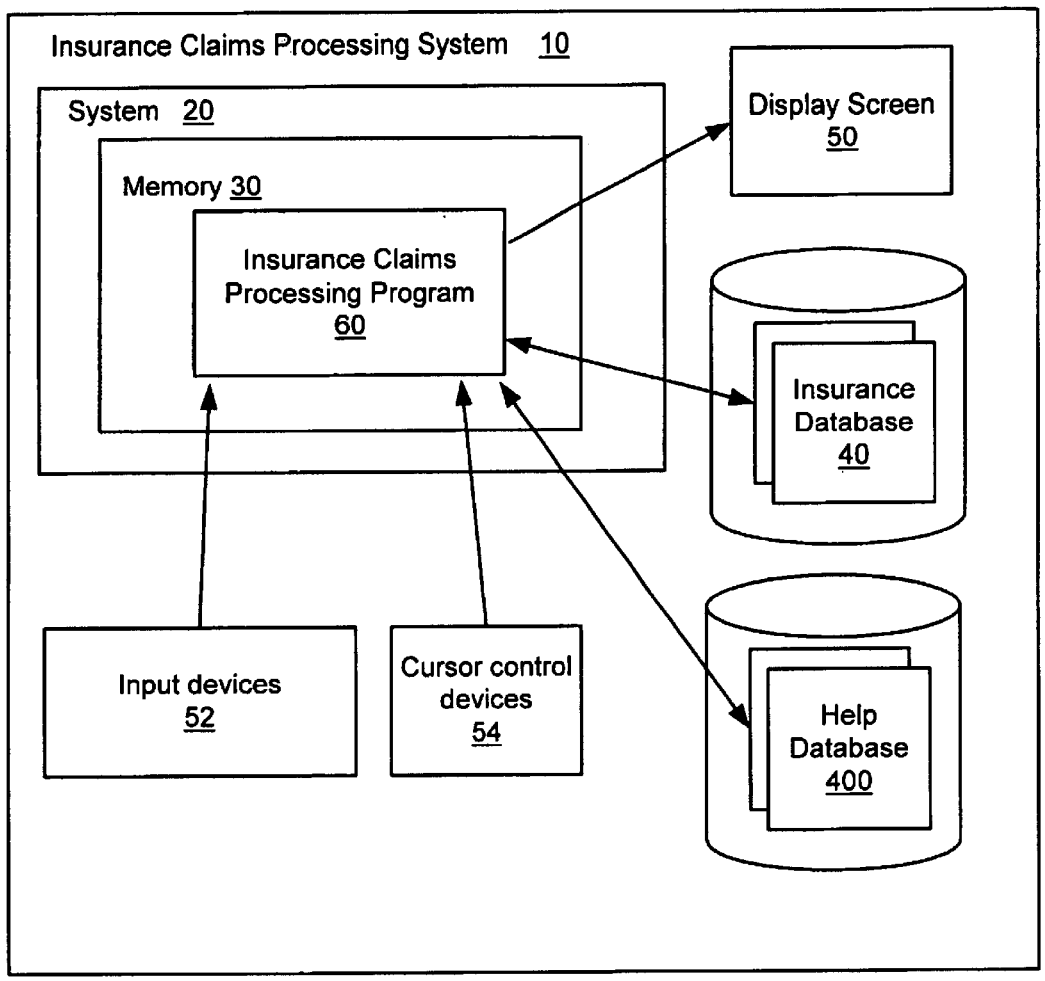
FIG. 1a is a block diagram illustrating the architecture of one embodiment of an insurance claims processing system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

DETAILED DESCRIPTION OF SEVERAL EMBODIMENTS

FIG. 1a—The Architecture of an Insurance Claims Processing System

In FIG. 1a, an embodiment of an insurance claims processing system 10 may include a computer system 20. The term "computer system" as used herein generally includes the hardware and software components that in combination allow the execution of computer programs. The computer programs may be implemented in software, hardware, or a combination of software and hardware. A computer system's hardware generally includes a processor, memory media, and Input/Output (I/O) devices. As used herein, the term "processor" generally describes the logic circuitry that responds to and processes the basic instructions that operate a computer system. The term "memory" is used synonymously with "memory medium" herein. The term "memory medium" is intended to include an installation medium, e.g., a CD-ROM, or floppy disks, a volatile computer system memory such as DRAM, SRAM, EDO RAM, Rambus RAM, etc., or a non-volatile memory such as optical storage or a magnetic medium, e.g., a hard drive. The memory medium may comprise other types of memory as well, or combinations thereof. In addition, the memory medium may be located in a first computer in which the programs are executed, or may be located in a second different computer that connects to the first computer over a network. In the latter instance, the second computer provides the program instructions to the first computer for execution. In addition, the computer system may take various forms, including a personal computer system, mainframe computer system, workstation, network appliance, Internet appliance, personal digital assistant (PDA), television system or other device. In general, the term "computer system" can be broadly defined to encompass any device having a processor that executes instructions from a memory medium.

The memory medium preferably stores a software program or programs for directing and managing transactions as described herein. The software program(s) may be implemented in any of various ways, including procedure-based techniques, component-based techniques, and/or object-oriented techniques, among others. For example, the software program may be implemented using ActiveX controls, C++ objects, JavaBeans, Microsoft Foundation Classes (MFC), or other technologies or methodologies, as desired. A CPU, such as the host CPU, executing code and data from the memory medium includes a means for creating and executing the software program or programs according to the methods, flowcharts, and/or block diagrams described below.

A computer system's software generally includes at least one operating system, a specialized software program that manages and provides services to other software programs on the computer system. Software may also include one or more programs to perform various tasks on the computer system and various forms of data to be used by the operating system or other programs on the computer system. The data may include but are not limited to databases, text files, and graphics files. A computer system's software generally is stored in non-volatile memory or on an installation medium. A program may be copied into a volatile memory when running on the computer system. Data may be read into volatile memory as required by a program.

A server may be defined as a computer program that, when executed, provides services to other computer programs executing in the same or other computer systems. The computer system on which a server program is executing may also be referred to as a server, though it may contain a number of server and client programs. In the client/server model, a server is a program that awaits and fulfills requests from client programs in the same or other computer systems.

The insurance claims processing system 10 may further include a display screen 50 connected to the computer system 20 and an insurance database 40 and a help database 400 residing on an internal or external storage. System 20 includes memory 30 configured to store computer programs for execution on system 20, and a central processing unit (not shown) configured to execute instructions of computer programs residing on system 20. Claims processing program 60 may be stored in memory 30.

The insurance claims processing system 10 may be used by an Insurance Company for various embodiments of a system and method for processing insurance claims. As used herein, an Insurance Company (IC) includes a business organization that provides insurance products and/or services to customers. More particularly, the insurance products may pertain to providing insurance coverage for accidents and the trauma-induced bodily injuries that may result due to the accident. Examples of trauma-induced bodily injuries may include, but are not limited to: loss of limb(s); bone fractures; head, neck and/or spinal injury, etc.

In one embodiment, on receiving a trauma-induced bodily injury, a customer may file an insurance claim (IC) with his/her insurance organization to cover medical and other accident-related expenses. An IC may utilize a computer-based insurance claim processing system to process insurance claims. In one embodiment, the processing may include estimating a value associated with the filed insurance claim.

As used herein, an IC business transaction may be defined as a service of an IC. Examples of business transactions include, but are not limited to: insurance transactions such as filing of claims, payment of claims, application for insurance coverage, and customized benefits, etc. Business transactions may also include services related to customers, insurance providers, employers, insurance agents, investigators, etc.

As used herein, an IC insurance claim processing includes a series of instructions executed by a computer system for processing an IC's business transactions. A claim processing system may include one or more processing tasks. A processing task may include a sequence of one or more processing steps or an ordered list or a structured list of one or more processing steps, associated with the business transaction to be processed by the claim processing system. In one embodiment, the sequence of steps may be fixed. In another embodiment the sequence of steps may be established dynamically, in real-time. In one embodiment, the sequence of one or more steps may include an initial step, a final step, one or more intermediary steps, etc. In one embodiment, an IC user may select steps to process an insurance claim in a sequential manner. In another embodiment, the IC user may select steps to process an insurance claim in a random or arbitrary manner. Examples of processing steps may include, but are not limited to: receiving an input from a user of the IC insurance claim processing system, reading a value from a database, updating a field in a database, displaying the results of a business transaction on a computer screen, etc.

In one embodiment, the insurance claim processing system utilizes objecto-riented technology to process insurance claims. In another embodiment, processing of insurance claims may utilize traditional programming languages and databases to achieve the same result. Insurance objects may be defined to represent or model real-world business features of insurance products and services. Examples of insurance objects may include, but are not limited to, objects representing the following: an insurance claim; an accident report; a settlement; an estimated claim; IC service facilities, customers, and employees; business process such as a new insurance application and calculation of a premium; interfaces to external insurance organizations; work tasks such as calculations, decisions, and assignments; temporal objects such as calendars, schedulers, and timers; and elemental data necessary to accomplish work tasks such as medical costs, risk factors, etc.

An insurance object may be represented on the computer screen by a graphical icon or by a display listing the properties of the insurance object in graphic and/or alphanumeric format. An insurance claim object may be. configured to gather and evaluate data for processing a filed insurance claim and to automatically make decisions about the insurance claim. The one or more processing steps associated with the processing of an insurance claim may also be configured as one or more processing step objects. In one embodiment, a display screen, which also may be referred to as a page, may be associated with a processing step. The display screen may also be represented as an object. Each display screen object may include a property to point to a previous display and another property to point to a next display screen. Each property, e.g. the next display pointer on a display screen object, may be changed dynamically by using methods associated with the display screen object. One display screen object may serve as the starting point for processing insurance claims. In one embodiment, the starting point for processing insurance claims may include acquiring an insurance claim identification number from an IC system user.

In one embodiment, during the processing of an insurance claim, a business rule and/or an IC system user input may determine that the insurance claim processing needs the execution of additional steps or tasks to continue the processing of the claim. The IC system user may provide inputs to the insurance claims processing program 60 at any display screen associated with a step included in the Table of Contents. The insurance claim processing software may dynamically modify the number of steps and/or the sequence of their execution to complete the claim processing transaction. An IC system user working at a client system may then iterate through the claim processing steps and arrive at an estimated value for the insurance claim.

In one embodiment, upon startup, the program 60 may provide a graphical user interface to display claims processing related information on display screen 50. It may collect user inputs, entered by using user input devices 52, and associated with insurance claims. It may process the user inputs, access an insurance database 40, use the contents of the insurance database 40 to estimate the insurance claim, and store it in memory 30 and/or insurance database 40. The program 60 may display a value of the estimated insurance claim on display screen 50. A user may view the display of the estimated insurance claim on display screen 50, and may interactively make modifications, additions, and deletions to the estimated insurance claim.

System 20 may also include one or more user input devices 52, such as a keyboard, for entering data and commands into the insurance claim program 60. It may also include one or more cursor control devices 54 such as a mouse for using a cursor to modify an insurance claim viewed on display screen 50. In response to the updating of the estimated insurance claim, the insurance claim program 60 may store the updated insurance claim in the insurance database 40.

In one embodiment, the insurance claims processing system may provide context-sensitive help for the processing steps. In one embodiment, the context-sensitive help for the step may be automatically invoked and displayed on display screen 50 when entering the step. In one embodiment, the user may interactively invoke context-sensitive help for the step by selecting one or more interface items on the display screen 50 with a cursor control device 54 such as a mouse. In one embodiment, the user may interactively invoke context-sensitive help for the step by using an input device 52. For example, the user may select one or more keys or a combination of keys on a keyboard to activate context-sensitive help. The context-sensitive help for each processing step may be unique, although content may appear in the context-sensitive help for two or more processing steps.

In one embodiment, information for the context sensitive help may be accessed from help database 400. Help database 400 may include one or more one or more documents including information that may be useful to a user in performing the various processing steps associated with insurance claims processing. Help database 400 may also include one or more tables that provide access to the information in the documents. Each table may include a plurality of records or entries that may be used to locate help information about processing steps and/or the elements in processing steps in the one or more documents in the help database 400.

In one embodiment, a search interface may be provided in the insurance claims processing system. A user may enter in the search interface one or more terms to be searched for in help database 400 for the insurance claims processing system. The user may then initiate the search for the one or more terms. The insurance claims processing system may then search the help database 400 for entries including at least one of the one or more terms. The insurance claims processing system may locate one or more entries in the help database 400 that include at least one of the one or more terms. The insurance claims processing system may then display information on display screen 50 from the located help database 400 entries.

Figure 1B:
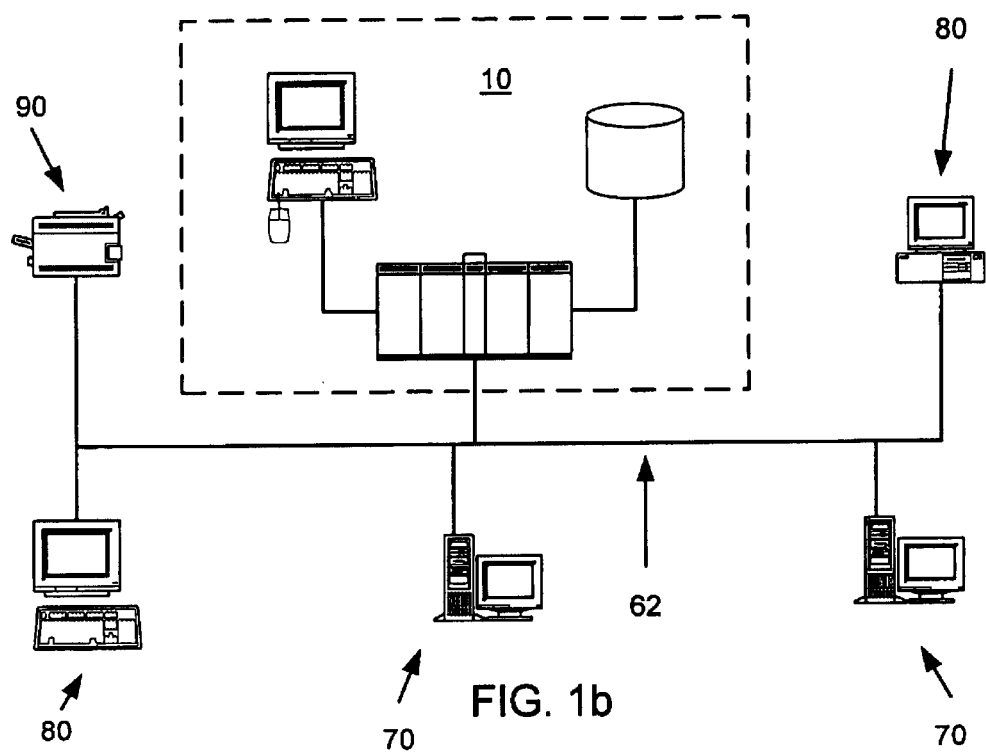
FIG. 1b illustrates one embodiment of a networked insurance claim processing system.

FIG. 1*b*—One Embodiment of a Networked Insurance Claim Processing System

FIG. 1*b* illustrates one embodiment of a networked system, configured for processing insurance claims. In this embodiment, the system is shown as a client/server system with the server systems and client systems connected by a network 62. Network 62 may be a local area network or wide area network, and may include communications links including, but not limited to: Ethernet, token ring, Internet, satellite, and modem. Insurance claims processing system 10 as illustrated in FIG. 1*a* may be connected to network 62. The insurance claims processing system software and insurance database 40 may be distributed among the one or more servers 70 to provide a distributed processing system for insurance claim transactions. In other words, an insurance claim processing transaction being processed by the insurance claim processing system may be routed to any server based upon the workload distribution among servers 70 at the time of the transaction. Insurance claim processing system servers 70 may be located on a local area network or may be geographically dispersed in a wide area network.

One or more client systems 80 may also be connected to network 62. Client systems 80 may reside at one or more claim processing units within the insurance company. In a wide area network, client systems 80 may be geographically dispersed. Client systems 80 may be used to access insurance claim processing system servers 70, insurance database 40 and help database 400. An insurance claim processing employee may use a client system 80 to access the insurance claim processing system and execute insurance transactions. An employee may also use a client system 80 to enter insurance claim inputs into the insurance claim processing system. One or more printers 90 may also be connected to network 62 for printing documents associated with insurance claim transactions.

Various embodiments further include receiving or storing instructions and/or data implemented in accordance with the description herein upon a carrier medium. Suitable carrier media include memory media or storage media such as magnetic or optical media, e.g., disk or CD-ROM, as well as transmission media or signals such as electrical, electromagnetic, or digital signals, conveyed via a communication medium such as networks and/or a wireless link.

Figure 2:
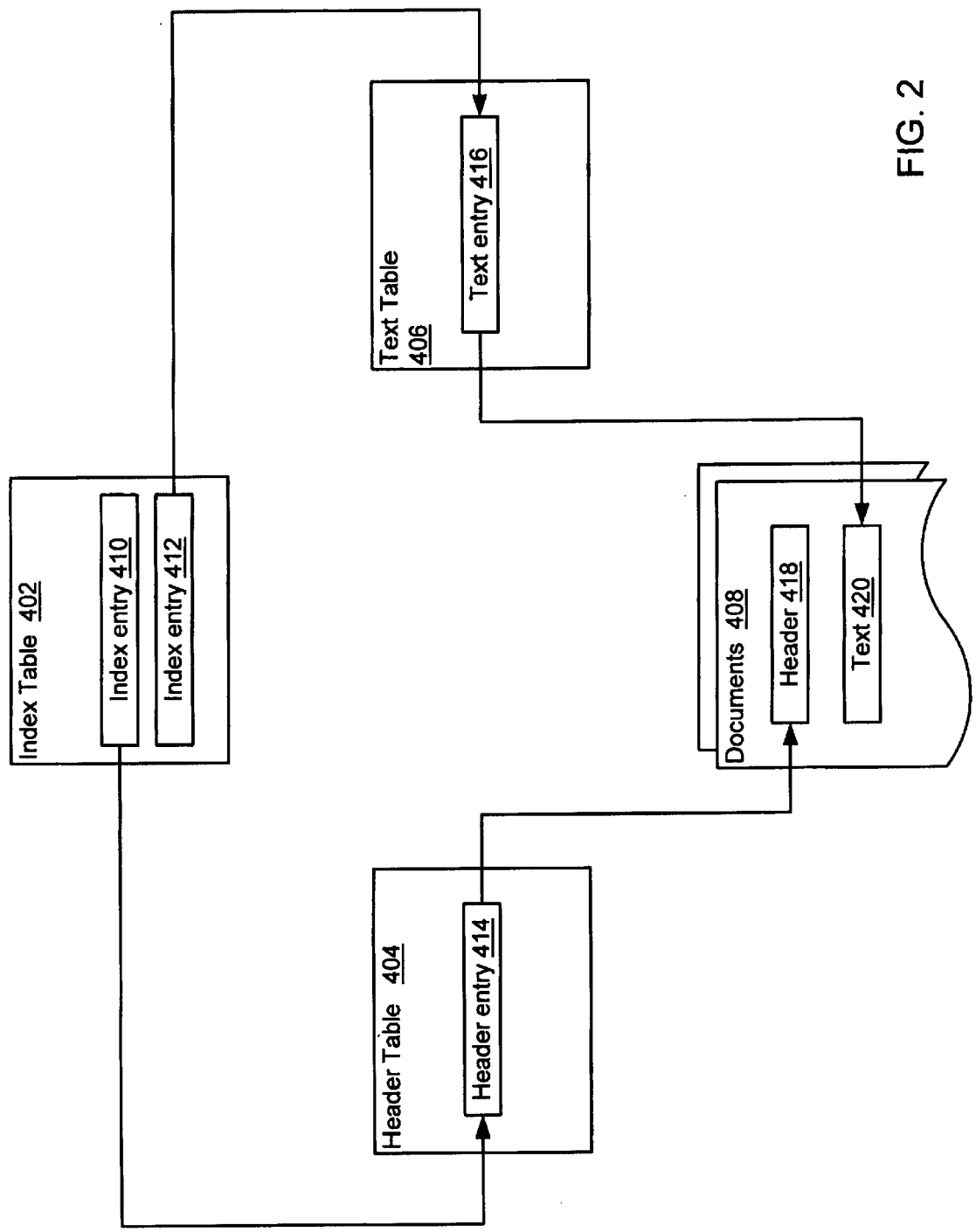
FIG. 2 illustrates a structure for an insurance claims processing help database that may be used for context sensitive help and for searching for terms according to one embodiment of an insurance claim processing system.

FIG. 2—An Insurance Claims Processing Help Database Structure

FIG. 2 illustrates one embodiment of an insurance claims processing help database 400 that may be used for context sensitive help and for searching for terms in an insurance claim processing system. Help database may include one or more index tables 402, one or more header tables 404, one or more text tables 406, and one or more documents 408. One embodiment may include one index table 402, one header table 404, and one text table 406. In another embodiment, the header table 404 and text table 406 may be combined into one master table comprising entries for header portions and text portions of the one or more documents 408.

Index tables 402, header tables 404, and text tables 406 may each include one or more records or entries. The entries in index tables 402 may each include a field comprising one or more terms or codes that may be used as keys for locating entries in header tables 404 and/or text tables 406. The entries in index tables 402 may each also include information for locating an entry in one of the one or more header tables 404 or text tables 406. In one embodiment, an identification number may be used to identify each entry in the one or more header tables 404 and text tables 406. The identification number may be referred to herein as an object ID. In one embodiment, each entry in the index tables 402 may include an object ID that identifies, and that may be used to locate, one entry in one of the header tables 404 or text tables 406. In one embodiment, index tables 402 may include two or more entries that include the same object ID. In other words, two or more index table 402 entries may indicate, or point to, the same entry in a header table 404 or text table 406. Each entry in index tables 402 may be referred to as an occurrence of the term or code included in the index table 402 entry in the help database 400.

In one embodiment, each entry in the header tables 404 and text tables 406 may include a unique object ID that may be used to locate the entry. In one embodiment, each entry in the header tables 404 may include a field containing a header or a portion of a header from one of the one or more documents 408. Alternatively, each entry in the header tables 404 may include information that may be used to locate a header or a portion of a header in one of the one or more documents 408. In one embodiment, each entry in the text tables 404 may include a field containing a text section or a portion of a text section from one of the one or more documents 408. Alternatively, each entry in the text tables 406 may include information that may be used to locate a text section or a portion of a text section in one of the one or more documents 408.

An example of locating headers and text in documents 408 using index tables 402, header tables 404 and text tables 406 follows. Index table may include index entries 410 and 412. Index entry 410 may include a term or code included in a header of one of the documents 408. Index entry 410 may include an object ID that may be used to locate header entry 414 in one of the header tables 404. Header entry 414 may include a portion or all of header 418 from one of the one or more documents 408. Alternatively, header entry 414 may include information that may be used to locate header 418 in one of the one or more documents 408. If index entry 410 includes a term, then the term may appear one or more times in header 418 and/or in the portion of header 418 included in header entry 414. If index entry 410 includes a code, then the code may indicate the index table entry 410 refers to a particular header or portion of a header in its entirety (i.e. this is not an occurrence of a term). In one embodiment, codes may be used to identify headers or sections of text in documents 408. In one embodiment, codes may be included as "hidden" text in one or more sections of documents 408, and may be used in constructing header tables 404 and text tables 406.

Index entry 412 may include a term or code included in a text section of one of the documents 408. Index entry 412 may include an object ID that may be used to locate text entry 416 in one of the text tables 406. Text entry 416 may include a portion or all of text section 420 from one of the one or more documents 408. Alternatively, text entry 416 may include information that may be used to locate text 420 in one of the one or more documents 408. If index entry 412 includes a term, then the term may appear one or more times in text section 420 and/or in the portion of text section 420 included in text entry 416. If index entry 412 includes a code, then the code may indicate the index table entry 412 refers to a particular text section or portion of a text section (i.e. this is not an occurrence of a term).

Figure 3:
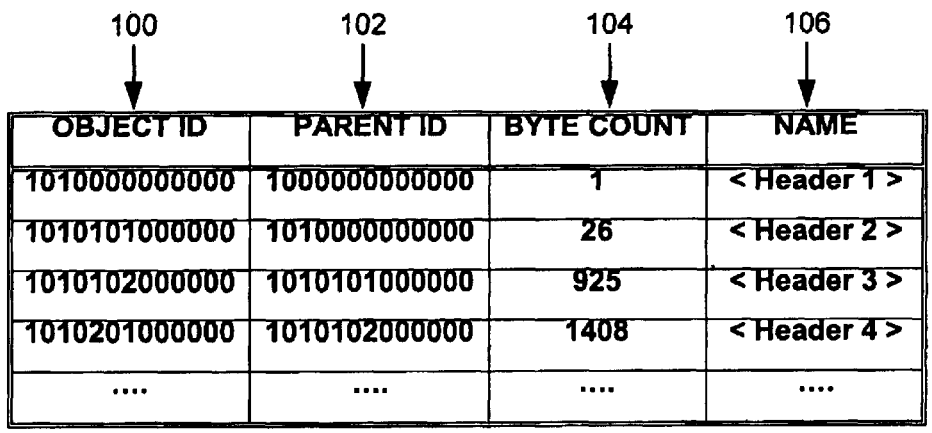
FIG. 3 illustrates a table including document header information according to one embodiment of an insurance claim processing system.
Figure 4:
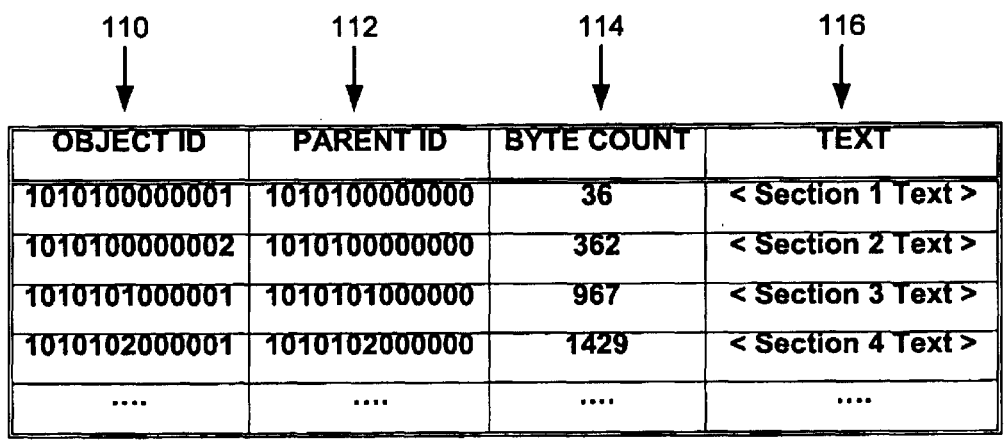
FIG. 4 illustrates a table including document text information according to one embodiment of an insurance claim processing system.

Embodiments of index tables 402, header tables 404 and text tables 406 are further described in FIGS. 3, 4, and 5, respectively.

FIG. 3—A Table Including Document Header Information

FIG. 3 illustrates one embodiment of a table including header information from one or more documents 408 related to insurance claims processing. The header table 404 may include a plurality of records, also referred to as entries, with one entry for each header element from the one or more documents 408 to be included in a help database 400 for the insurance claims processing system. Each entry may comprise a plurality of fields, which also may be referred to as elements of the entry.

An entry may include an object identifier (object ID) 100 for the entry. In one embodiment, the object ID 100 for the entry may be unique in the help database 400. In one embodiment, the object ID 100 may include information that may be used to identify the document that includes the header, and the location in the document of the header. For example, the object ID 100 of the first entry in the header table 404 of FIG. 3 may indicate that the entry is for the header of the first chapter of a first document included in the help database 400, the object ID 100 of the second entry may indicate that the entry is for the header of the first section of the first chapter of the first document, and so on.

An entry may also include the object identifier of a parent entry (parent ID 102) for the entry. For example, the parent ID 102 of the entries for the headers of several sections in the first chapter of a document may be the object ID 100 of the entry for the header of the chapter.

An entry in the header table 404 may also include information on the location in the document of the header. For example, byte count 104 may represent the byte (character) location in the document of the start of the header. For example, the header of the first entry in the header table 404 illustrated in FIG. 3 may start at the first byte of the document, the header of the second entry may start at the $26^{th}$ byte of the document, etc.

In one embodiment, an entry in the header table 404 may also include the alphanumeric text of the header from the document in name field 106. When the entry is located during context sensitive help or a search, the header text in name 106 may be read from the header table and displayed on the display screen for the user to view. In another embodiment, the entry may not store the actual text for the header, but may instead include information for locating the text for the header in the document. In this embodiment, when the entry is located, the actual text of the header may be read from the document itself and displayed for the user.

The order of the columns and rows in the header table 404 as illustrated in FIG. 3 is exemplary and is not intended to be limiting.

FIG. 4—A Table Including Document Text Information

FIG. 4 illustrates one embodiment of a table including text information from one or more documents 408 related to insurance claims processing. The text table 406 may include a plurality of entries, with one entry for each text section from the one or more documents 408 to be included in the help database 400 for the insurance claims processing system. Each entry may comprise a plurality of fields, which also may be referred to as elements of the entry. In one embodiment, the fields may be substantially similar to the fields in embodiments of the header table 404 as illustrated in FIG. 3.

An entry may include an object identifier 110 (object ID), for the entry. In one embodiment, the object ID 110 for the entry may be unique in the help database 400. In one embodiment, the object ID 110 may include information that may be used to identify the document including the text section and the location in the document of the text section. Object ID 110 may also include information to distinguish a text table 406 entry from a header table 404 entry. For example, a non-zero last digit in the object ID 110 may indicate that the entry is a text table 406 entry and not a header table 404 entry. The entry may also include the object identifier of a parent entry (parent ID 112) for the entry. The parent ID 112 may point to an entry in the text table 406 as the parent of the entry. The entry may also include a text field 116 that may include some or all of the text from a section of one of the one or more documents 408 in the help database 400. When the entry is located during context sensitive help or a search, the text in text field 116 may be read from the text table and displayed on the display screen for the user to view. Alternatively, the entry may not store the actual text, but may instead include information for locating the text in the document. In this case, when the entry is located, the actual text may be read from the document itself and displayed for the user.

The order of the columns and rows in the text table illustrated in FIG. 4 is exemplary and is not intended to be limiting.

FIG. 5—An Index Table

FIG. 5 illustrates one embodiment of an index table 402 for locating terms and/or codes for context-sensitive help and for interactively searching for terms in the help database 400. Each entry in the index table 402 may represent an occurrence of a term or code in the one or more documents 408 included in the help database 400 for the insurance claims processing system. Examples of documents that may be included in the help database 400 for the insurance claims processing system include, but are not limited to: medical journals, textbooks and/or manuals, insurance claims processing manuals or guidebooks, medical glossaries and/or dictionaries, and documents including context sensitive help entries for the insurance claims processing steps, and elements of the steps, in the insurance claims processing system.

An entry in the index table 402 may include an object ID 140. The object ID 140 may indicate a unique entry in a help information table in the help database. In one embodiment, the help information database may include one or more header tables 404 as illustrated in FIG. 3 and one or more text tables 406 as illustrated in FIG. 4.

An entry in the index table may also include a term field 142. In one embodiment, term field 142 may include one or more terms located in the one or more documents 408 in the help database 400. In one embodiment, term field 142 may include a code representing a step or page in the insurance claims processing system or an element in a step in the insurance claims processing system. The codes may be used in invoking context-sensitive help in the insurance claims processing system. One embodiment may include one or more entries with one or more terms in term field 142 and one or more entries with codes in term field 142.

An entry in the index table 402 may also include a Soundex field 144. Soundex is a commonly used algorithm for encoding words so that similar sounding words encode the same. In one embodiment, the first letter of a word to be converted to a Soundex equivalent may be copied unchanged, and then subsequent letters may be encoded as follows:

b,f,p,v→"1"
c,g,j,k,q,s,x,z,ç→"2"
d,t→"3"
l→"4"
m,n,ñ→"5"
r→"6"

Other characters may be ignored and repeated characters may be encoded as though they were a single character. Encoding may stop when the resulting string is four characters long, adding trailing "0"s if it is shorter. As an example, "SMITH" or "SMYTHE" may both be encoded as "S530". The Soundex equivalent may be used for locating entries in index table when a user mistypes or misspells a word when initiating a search. In one embodiment, codes for steps and step elements are not given a Soundex equivalent, as a Soundex equivalent of a code is not generally useful.

Columns 146, 148, and 150 may be used during calculation of the relevance of an entry. For each entry in the index table 402, column 146 may indicate the position of the term or code in the text section or header in which this occurrence of the term or code appears. Column 148 may indicate the total count of words in the text section or header. For example, in the first entry of the index table 402 as illustrated in FIG. 5, the position column 146 indicates that the term "System" appears as the fifth word of the 54 words (from the total words column 148) in the text section indicated by the object ID column 140. Examining the second entry, the term "System" appears again as the ninth word of the same text section.

In one embodiment, the word count column 150 may be used with entries for headers in calculating the relevance value 152. Different information and methods may be used for calculating the relevance of occurrences of terms and codes appearing in headers than the information and methods used to calculate the relevance for terms and codes appearing in text sections. In calculating the relevance for headers, the percent of the total word count indicated in column 150 may be used as part of the calculation. The word count 150 indicates how many words make up the one or more words (or words represented by a code) as represented in column 142. For example, in the header entry in the seventh row of the index table as illustrated in FIG. 5, the term "Anatomy" is in the third position (as indicated by column 146) of three words (as indicated by column 148) and includes one word. Thus, when calculating the relevance, "Anatomy" is approximately 33% of the header.

The last column of the index table 402 illustrated in FIG. 5 may hold a calculated relevance 152 for the occurrence. The relevance may be calculated in advance for all occurrences. Alternatively, the relevance for occurrences may not be calculated in advance and stored in the index table 402, but instead may be calculated dynamically as needed. In one embodiment, columns 146, 148, and 150 may not be stored in the index table 402. Instead, the information may be used to calculate the relevance and then discarded. One embodiment of the index table 402 may include only an object ID 140, a term 142, and a relevance value 152. Another embodiment of an index table 402 may only include an object ID 140 and a term 142, and the relevance may be calculated dynamically.

In one embodiment, occurrences in headers may be considered of higher relevance than occurrences in text sections. Therefore, different methods may be applied to calculate the relevance of occurrences in headers than are applied to calculate the relevance of occurrences in text sections. In one embodiment, relevance values may be scaled to be between 0.0 and 1.0, with 1.0 being the highest relevance. In one embodiment, the relevance may be calculated so that a relevance value of 0.0 does not occur. Note that any scale may be used for the relevance calculation, as it may be the ordering of the relevance values that is useful, and not necessarily the scale on which the relevance values are calculated.

In one embodiment, a maximum relevance value may be provided for occurrences in text sections. This maximum value may be applied as a weight or scaling factor during the relevance calculation. In one embodiment, the maximum relevance value for occurrences in text sections may also serve as the minimum value for occurrences in headers. In this embodiment, header occurrences may always have at least as high a relevance value as the highest relevance text occurrences. In another embodiment, header occurrences may always have a higher relevance value than the highest relevance text occurrences.

The following is an example of using the tables in FIGS. 3, 4 and 5 for context-sensitive help in an insurance claims processing system. A user of the insurance claims processing system may begin processing of an insurance claim. The system may enter the first step in the processing of the claim. The first step may be displayed in a "page" on the display screen for the user. Information about the first step and the display page for the first step may be stored in the computer executing the insurance claims processing system. In this information, a code for the step, which may also be viewed as a code for the page, may be stored. When the step is entered, the code may be read from the information, and the context-sensitive help system may search the index table 402 for one or more entries with a code in term field 142 matching the code for the step. Upon locating the one or more entries in the index table 402, the context-sensitive help system may locate one or more entries in the header tables 404 and/or text tables 406 in the help database 400 corresponding to the object IDs 140 in the entries in the index table 402. The header and text from the located one or more entries in the header tables 404 and/or text tables 406 may then be displayed as help information items on the display screen for the user. There may be one help information item displayed for each located entry in the index table 402. In one embodiment, the help information items may be displayed in an order of relevance using the relevance values 152 for the located entries in the index table 402.

Elements within a step may also be given a code, and the code may be included in one or more entries in the index table 402. When a step in insurance claims processing is entered, one or more codes for one or elements of the step may also be read from stored information about the step. Occurrences of help information for the one or more codes may be searched for, ranked by relevance, and displayed similarly to, and along with, the code for the step as described above.

The order of the columns and rows in the index table 402 illustrated in FIG. 5 is exemplary and is not intended to be limiting.

FIGS. 6a—6h—Generating a Help Database

Figure 6A:
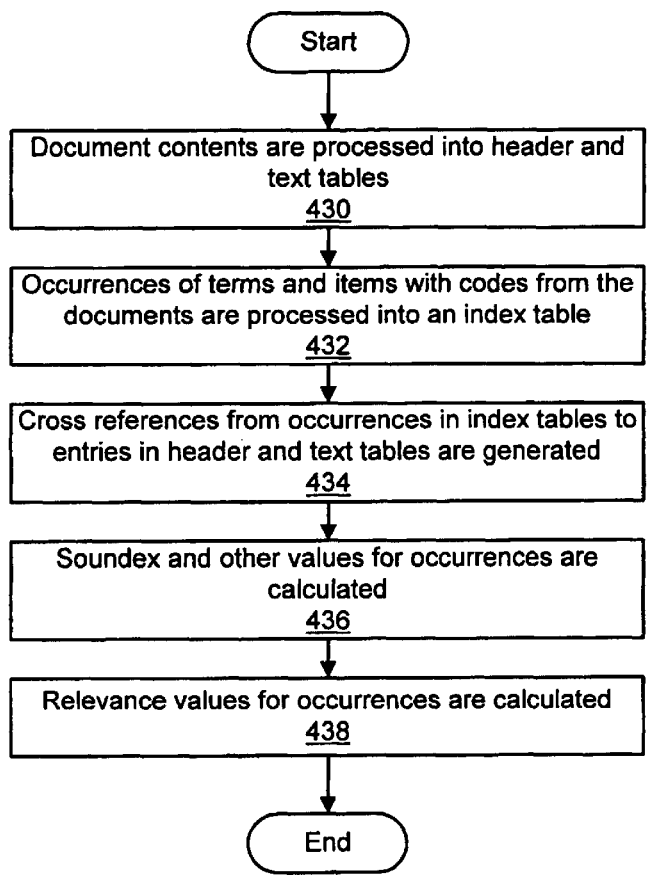
FIG. 6a is a flow diagrams illustrating a method for generating the various tables in an insurance claims processing help database according to one embodiment of an insurance claim processing system

FIG. 6a is a flow diagram illustrating one embodiment of a mechanism for generating an insurance claims processing help database 400. In step 430, one or more documents may be processed into header tables 404 and text tables 406. In one embodiment, one entry is added to a header table 404 for each header in the one or more documents 408 in the help database 400. In one embodiment, one entry may be added to a text table 406 for each text section in the one or more documents 408 in the help database 400. An object ID may be assigned to each entry added to a header table 404 or text table 406. A parent ID of each entry may also be identified. The number of bytes in the section of text or header for the entry may also be determined. In one embodiment, the entry for each occurrence may include the object ID, parent ID, byte count and text section for text table 406 entries or header text for header table 404 entries.

In step 432, one or more index tables 402 may be generated. In one embodiment, a plurality of terms may be searched for in the header text of the entries in the one or more header tables 404 and in the text section of the entries in the one or more text tables 406. Each located occurrence of each term may be recorded as an entry in an index table 402. In one embodiment, one or more codes may be associated with headers and/or text sections in the one or more documents, and the one or more codes may be searched for in the header tables 404 and text tables 406. Each located occurrence of each code may be recorded as an entry in an index table 402. In one embodiment, a code may be used to identify a particular section of text or header in the one or more documents 408. For example, a code may be used to identify a section of text that may be displayed as the context sensitive help for a step in the insurance claims processing step. In one embodiment, an entry may be added to the index table for each occurrence of a term or code located in the name field 106 of an entry in a header table 404 or in the text field 116 of an entry in a text table 406. In step 434, the object ID of the header table 404 entry or text table 406 entry where each occurrence was located may be inserted in the object ID field 140 of the index table 402 entry for the occurrence.

In step 436, one or more other fields may be added to the entries in the index table 402. In one embodiment, a Soundex equivalent 144 may be added to entries that include a term in the term field 142. In one embodiment, a Soundex equivalent 144 may not be added for entries with a code in the term field 142. In one embodiment, for each entry in the index table 402, the position of the term or code in the text section or header in which this occurrence of the term or code appears may be entered in a position field 146. In one embodiment, the total count of words in the text section or header may be entered in a total words field 148. In one embodiment, for each header table 404 entry in the index table 402, a word count 150 may be entered that indicates the number of words in the term 142 for this occurrence. In one embodiment, for occurrences in text tables 406, a word count of zero may be entered.

In step 438, the relevance value 152 for each occurrence may be calculated and entered in index table 402. In one embodiment, the relevance value 152 for each occurrence may be calculated up front, when the help database tables are generated. In another embodiment, the relevance value 152 for an occurrence may be calculated dynamically when the occurrence is located for display in the insurance claims processing system. In this embodiment, the index table 402 may not include a relevance value 152 for each occurrence.

Figure 6B:
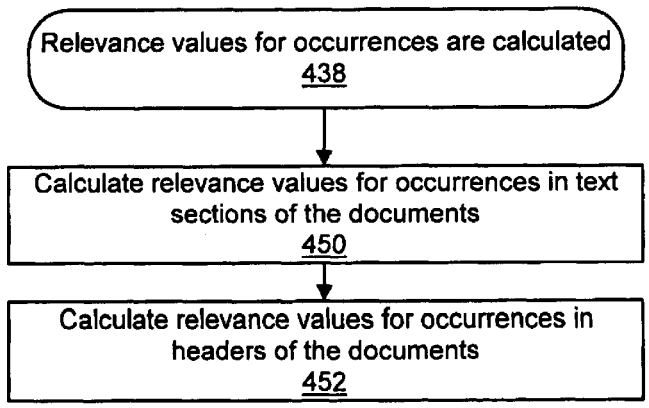
FIGS. 6b through 6g are Flow diagrams illustrating a mechanism for generating relevance values for occurrences in an insurance claims processing help database according to one embodiment of an insurance claims processing system.

FIGS. 6b through 6h expand on step 438 of FIG. 6a and further describe several embodiments of a mechanism for calculating the relevance values 152 of occurrences in the help database. In FIG. 6b, the relevance values 152 for occurrences in text sections of the one or more documents may be calculated in step 450. In step 452, the relevance values 152 for occurrences in headers of the one or more documents may be calculated. In one embodiment, a different mechanism may be used to calculate the relevance values 152 for occurrences in headers than the mechanism used to calculate the relevance values 152 for occurrences in text sections.

Figure 6C:
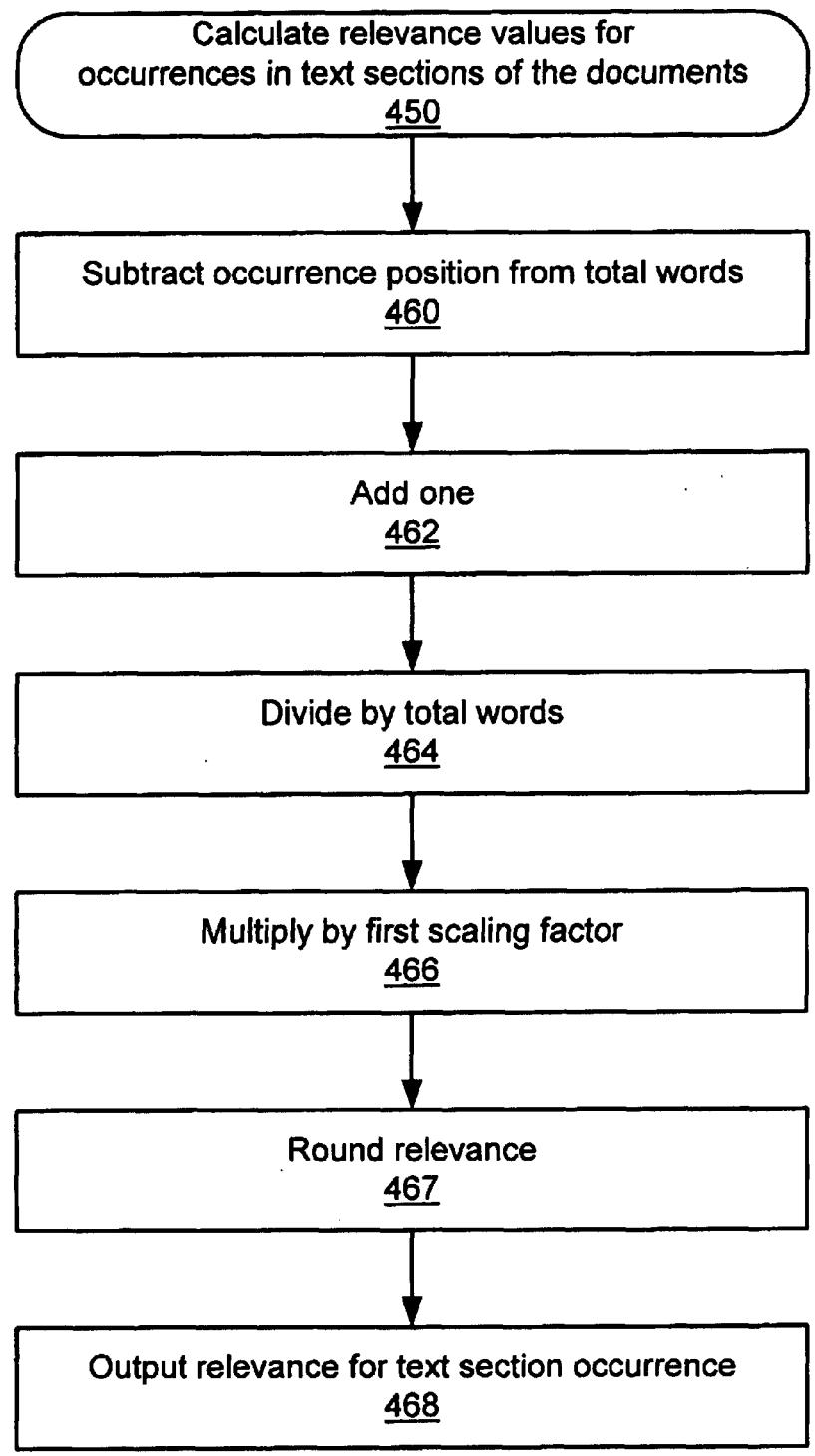

FIG. 6c expands on step 450 of FIG. 6b and further describes one embodiment of a mechanism for calculating relevance values 152 for occurrences in text sections of the one or more documents in the help database. In step 460, the position 146 of the occurrence in the text section may be subtracted from the total words 148 for the text section. In one embodiment, the words in the text section may be numbered in a sequence from a first word to a last word. In one embodiment, the first word may be numbered as word 0, and the last word as word (N–1), where N is the total number of words in the text section. In another embodiment, the first word may be numbered as word 1, and the last word as word N, where N is the total number of words in the text section. In this embodiment, in step 462, the results of step 460 may be incremented by one, which may be effective to prevent the relevance value from being zero. For example, applying step 460 to word 10 in a section with 10 words produces (10–10)=0. Incrementing by one thus may assure that a relevance of zero is not produced. One skilled in the art will recognize that there may be various other methods for assuring that a relevance of zero is not produced. In yet another embodiment, the words may be numbered in reverse order, with the first word in the text section being numbered as word N, and the last word as word 1. In this embodiment, steps 460 and 462 may not be performed.

In step 464, the results of step 462, or the results of step 460 in embodiments in which step 482 is not performed, may be divided by the total words 148 for the text section to produce a ratio R1 that may represent the relevance value 152 for the text occurrence. In embodiments where steps 460 and 462 are not performed, in step 464, the word number of the term in the text section may be divided by the total words 148 to produce the ration R1. In one embodiment, the ratio R1 may be in the range (0<R1<=1.0). In one embodiment, occurrences in headers may be considered more relevant than occurrences in text sections. In this embodiment, in step 466, R1 may be multiplied by a first scaling factor S1 to lower the relevance values of text section occurrences in relation to occurrences in headers. For example, a scaling factor S1 of 0.33 may be applied to R1. Thus, in on embodiment, after step 466, R may be in the range (0<R1<= S1).

In one embodiment, in step 467, the output of step 466, or the output of step 464 in embodiments where step 466 is not performed, may be rounded to a number of significant digits. Various rounding methods may be used including rounding up, rounding down, and rounding to the nearest value. For example, if two significant digits are desired, the results may be rounded to produce results in the range (0.01–1.00) inclusive. In step 468, the results are output as the relevance value 152 for the occurrence in the text section. In one embodiment, the output relevance value 152 may be written to the index table 142.

The following is an example of applying one embodiment of a mechanism for calculating the relevance value for a text occurrence and is not intended to be limiting in any way. The first row of the index table 402 as illustrated in FIG. 5 shows that the term "System" appears as the fifth of 54 words in a text section. A first scaling factor S1 of 0.33 is to be applied and the results rounded to two significant digits. Applying the steps of FIG. 6c:

Step 460: 54–5=49

Step 462: 49+1=50

Step 464: 50/54=@0.925925

Step 466: 0.925925*0.33=0.30555525

Step 467: Round (0.30555525)=0.31

Figure 6D:
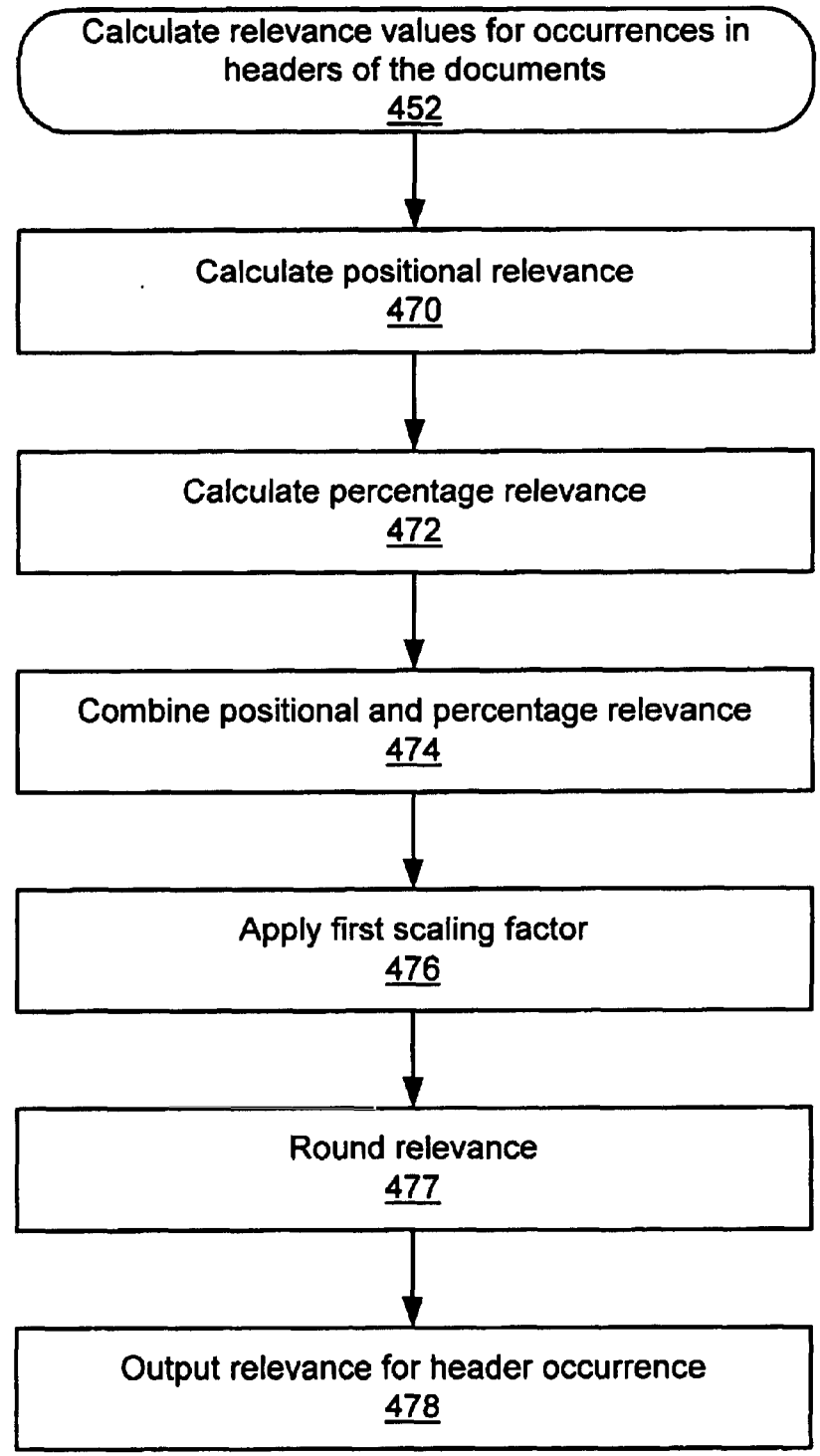

FIG. 6d expands on step 452 of FIG. 6b and further describes one embodiment of a mechanism for calculating relevance values 152 for occurrences in headers of the one or more documents in the help database. In step 470, a first relevance value based on the position of the term in the header may be calculated. In step 472, a second relevance value based on the percentage of the header the term occupies may be calculated. In step 474, the positional and percentage relevance values may be combined. In one embodiment, occurrences in headers may be considered more relevant than occurrences in text sections. In this embodiment, in step 476, the relevance value may be adjusted using a first scaling factor to adjust the relevance value in relation to the relevance values of occurrences in text sections. In one embodiment, in step 477, the output of step 476, or the output of step 474 in embodiments where step 476 is not performed, may be rounded to a number of significant digits substantially similarly to the rounding method used in step 467 of FIG. 6c. In step 478, the results may be output as the relevance value 152 for the occurrence in the header. In one embodiment, the output relevance value 152 may be written to the index table 142.

Figure 6E:
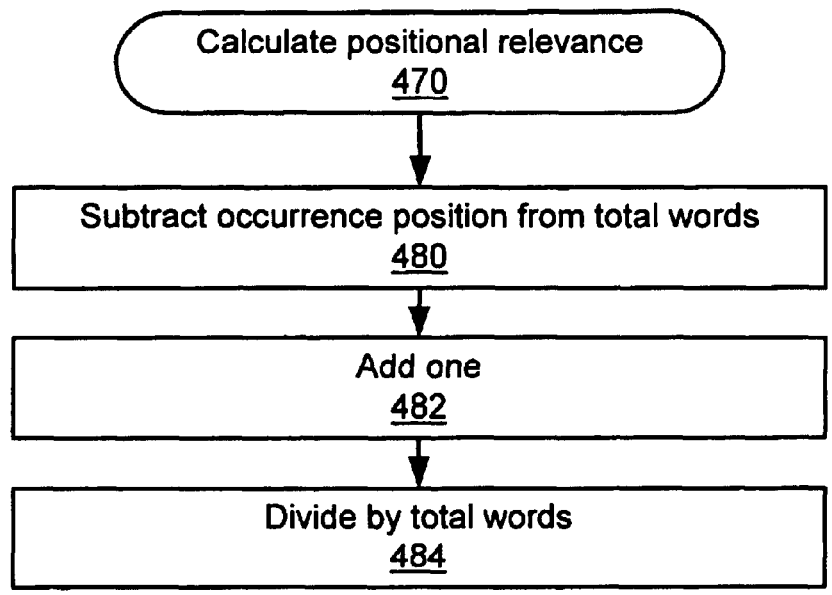

FIG. 6e expands on step 470 of FIG. 6d, illustrating one embodiment of a mechanism for calculating the positional relevance of an occurrence in a header. In one embodiment, this mechanism may be substantially similar to the mechanism described in steps 460 to 464 of FIG. 6c. In step 480 of FIG. 6e, the position 146 of the occurrence in the header may be subtracted from the total words 148 for the occurrence. In one embodiment, in step 482, the results of step 480 may be incremented by one, which may be effective to prevent the relevance value from being zero. One skilled in the art will recognize that there may be various other methods for assuring that a relevance of zero is not produced. In step 484, the results of step 482, or the results of step 480 in embodiments in which step 482 is not performed, may be divided by the total words 148 for the occurrence to produce a ratio R2 that may represent the relevance value 152 for the header occurrence. The ratio R2 may be in the range (0<R2<=1).

Figure 6F:
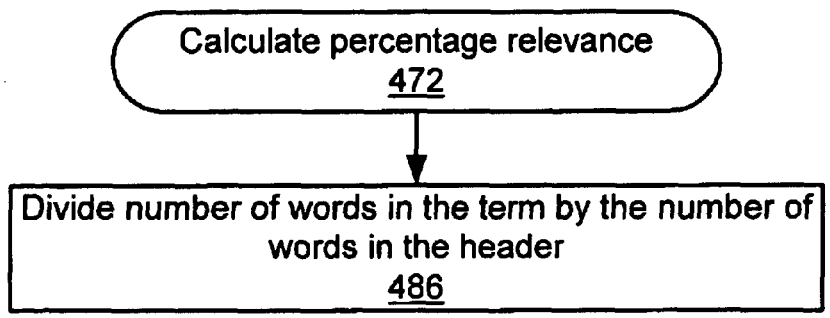

FIG. 6f expands on step 472 of FIG. 6d, illustrating one embodiment of a mechanism for calculating the percentage relevance of an occurrence in a header. In one embodiment, a term may include one or more words. In step 486, the number of words 150 in the term 142 may be divided by the total number of words 148 in the header to produce the percentage of the header occupied by the term. For example, if a term comprises two words, and a header where an occurrence of the term is found comprises three words, then the percentage relevance may be calculated as $2/3$=0.667.

Figure 6G:
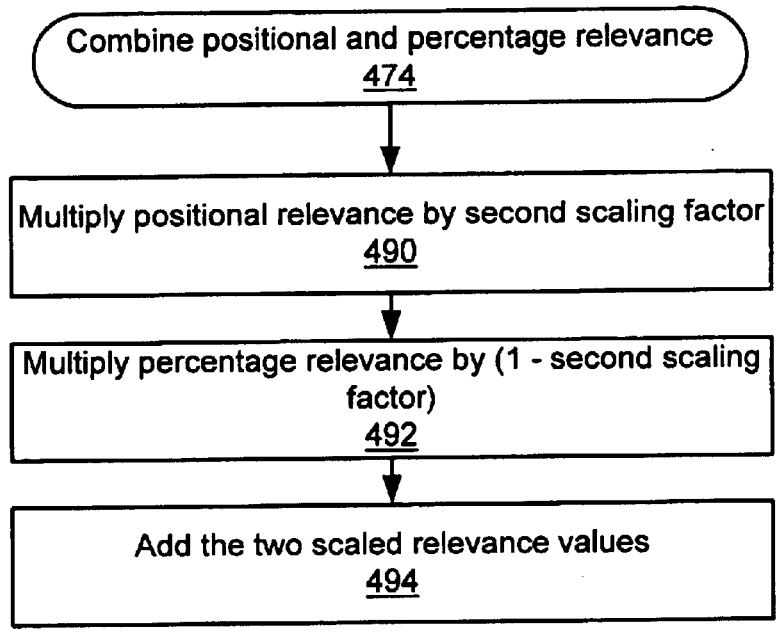

FIG. 6g expands on step 474 of FIG. 6d and illustrates one embodiment of a mechanism for combining the positional relevance as calculated in FIG. 6e and the percentage relevance as calculated in FIG. 6f for an occurrence in a header. In one embodiment, the positional relevance may be multiplied by a second scaling factor S2 in step 490. In step 492, the percentage relevance may be multiplied by (1–S2). In one embodiment, the percentage relevance may be considered more important than the positional relevance, and thus the percentage relevance may be given a larger weight than the positional relevance. For example, S2 may be assigned a value of 0.33, and the positional relevance multiplied by S2. The percentage relevance may then be multiplied by (1–S2)=0.67. In step 494, the scaled position and percentage relevance values may be added to produce the relevance value for the occurrence in the header.

Figure 6H:
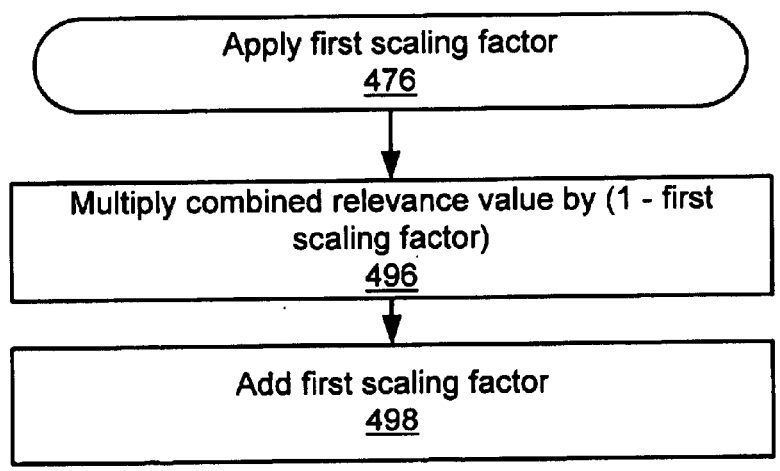

In one embodiment, occurrences in headers may be considered more relevant than occurrences in text sections. FIG. 6h expands on step 476 of FIG. 6d and illustrates one embodiment of a mechanism for adjusting the header relevance value in relation to the relevance values of occurrences in text sections. In step 496, the header relevance value results of step 494 may be multiplied by (1–S1), where S1 is the first scaling factor as described in step 466 of FIG. 6c. For example, if S1=0.33, then the combined relevance value may be multiplied by (1–0.33)=0.67. In one embodiment, the scaled header relevance value may then be adjusted by adding the first scaling factor S1 to the header relevance value, so that the minimum header relevance value is higher than the maximum text section relevance value. For example, if S1=0.33, then the maximum text section relevance value may be 0.33. By applying step 498, the minimum header relevance value may be 0.34. In one embodiment, after performing steps 496 and 498, a header relevance value R3 may be within the range ((S1+1)<=R<=1.0).

The following is an example of applying one embodiment of a mechanism for calculating the relevance value for a header occurrence and is not intended to be limiting in any way. The eighth row of the index table 402 as illustrated in FIG. 5 shows that the term "Anatomy" appears as the second of five words in a header. A first scaling factor S1=0.33 and a second scaling factor S2=0.3 are to be used, and the results rounded to two significant digits. Applying the steps of FIG. 6d–6h:

Step 470 (FIG. 6e):
Step 480: 5−2=3
Step 482: 3+1=4
Step 484: 4/5 =0.8
Step 472 (FIG. 6f):
Step 486: 1/5 =0.2
Step 474 (FIG. 6g):
Step 490: 0.8*0.3=0.24
Step 492: 0.2*(1.0−0.3)=0.14
Step 494: 0.24+0.14=0.38
Step 476:
Step 496: 0.38*(1.0−0.33)=0.2546
Step 498: 0.2546+0.33=0.5846
Step 477:
Round (0.5846)=0.58

Figure 7A:
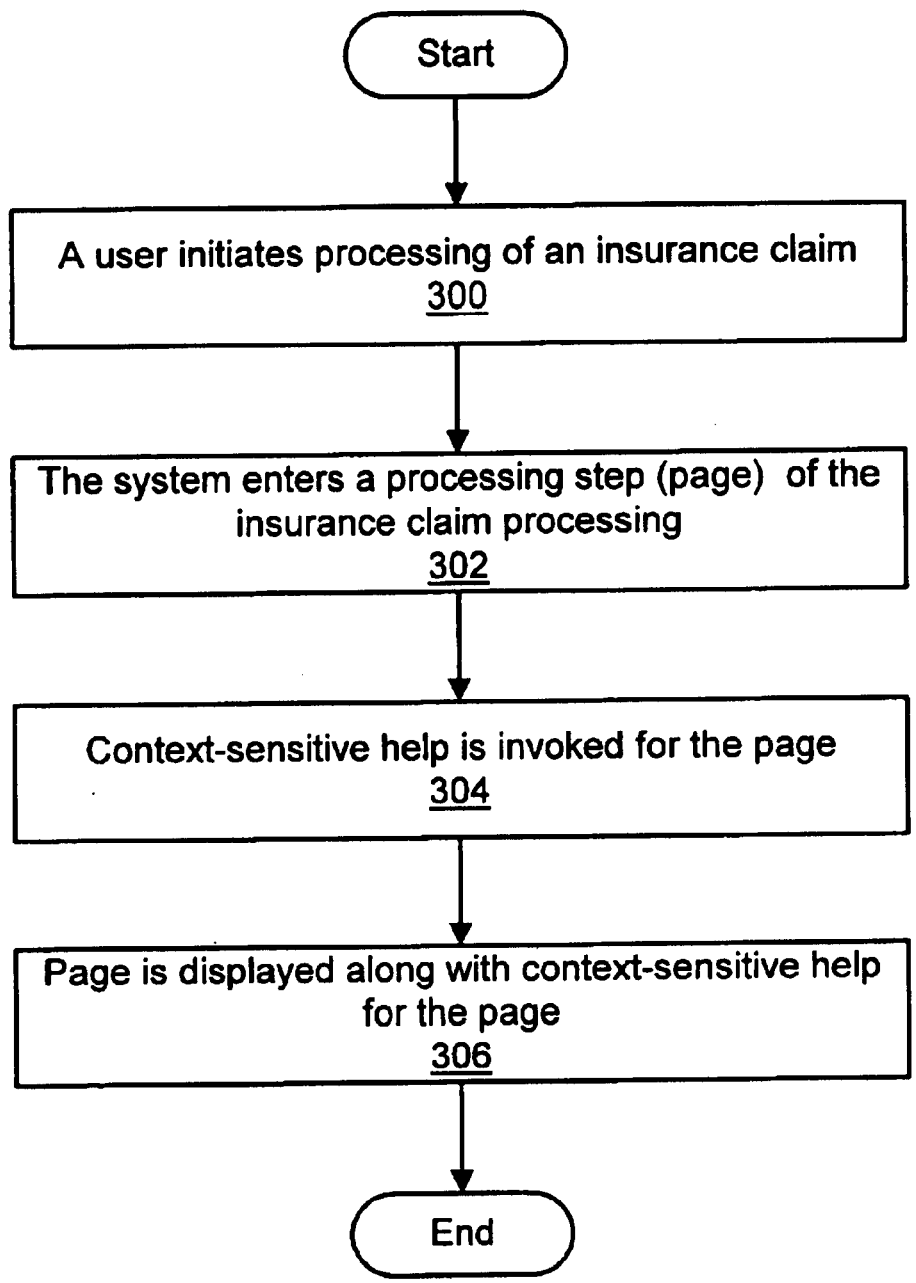
FIGS. 7a–7c are flow diagrams illustrating a mechanism for providing context-sensitive help according to one embodiment of an insurance claim processing system.
Figure 7B:
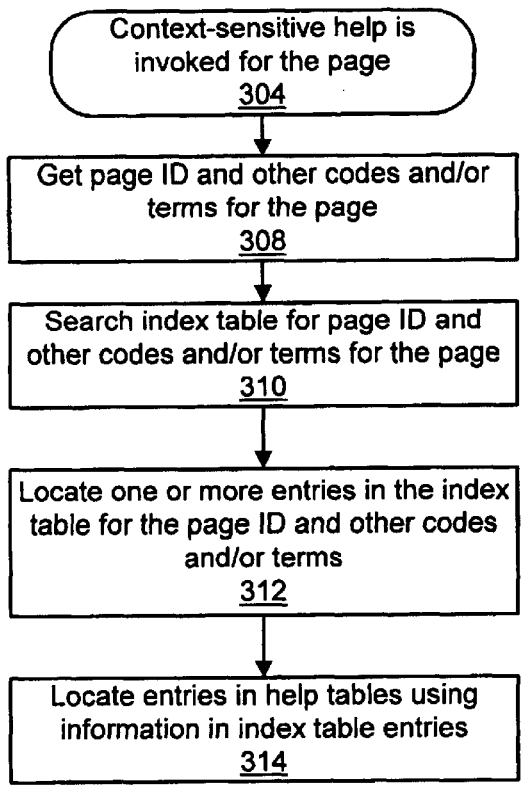
Figure 7C:
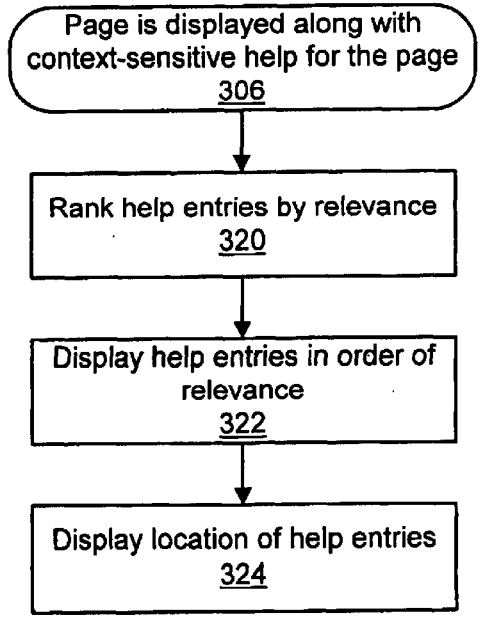

FIGS. 7a–7c—A Mechanism for Providing Context-sensitive Help

FIGS. 7a through 7c are flow diagrams describing embodiments of a mechanism for providing context-sensitive help in an insurance claims processing system. FIG. 7a illustrates a high-level view of the entire process, while FIGS. 7b and 7c give more detail of various steps of FIG. 7a.

In FIG. 7a, a user may initiate processing of an insurance claim in the insurance claims processing system in step 300. The insurance claims processing may begin at a first processing step, and may continue through a number of processing steps until the insurance claim has been processed. A next processing step may be determined by the user input at a current processing step. Each processing step may be displayed to the user in one or more pages on a computer display screen.

In step 302, the claims processing system may enter a processing step and display a page for the processing step. In step 304, the context-sensitive help for the page may be invoked. Context-sensitive help for each processing step may be unique, although content may appear in the context-sensitive help for two or more processing steps. Context-sensitive help may also be unique for each of the one or more pages within a processing step. In step 306, the page for the processing step may be displayed along with the context-sensitive help for the page. In one embodiment, the displayed page may occupy substantially the entire display screen on the display device. In another embodiment that supports windows, the page may be displayed in a window on the display screen. In one embodiment, the page may be divided into two or more panes, the context-sensitive help may be displayed in one or more panes on the page, and the processing step contents may appear in one or more panes on the page.

FIG. 7b illustrates step 304 of FIG. 7a in more detail. In step 304 of FIG. 7a, the context-sensitive help for the page is invoked. In step 308, items to be searched for in the context-sensitive help system may be determined. In one embodiment, each page in the insurance claims processing system may have a unique code, which may be referred to as a page ID. The page ID for the invoked page may be read. In one embodiment, the page ID may be stored with information describing the page that is read by the claims processing system prior to displaying the page. The information may describe the format and contents of the page. Alternatively, the page ID may be "hardcoded" into the code of the claims processing system.

The page may include one or more elements that have associated codes. The codes for the one or more elements on the page may also be read. In one embodiment, the elements on the page may be system-supplied "answers" to questions posed to the user during the claims processing. In one embodiment, the answers may be classifications for injuries, anatomical regions, etc. used during injury claims processing. In another embodiment, instead of reading codes for the elements, the text of the elements may be read.

In step 310, the insurance claims processing system may search one or more index tables as illustrated in FIG. 6 for entries including the page ID that may be used to locate help entries for the page in one or more help tables as illustrated in FIGS. 4 and 5. The index table may also be searched for entries for the elements of the page. In one embodiment, a code for an element is used to search the one or more index tables for entries. In another embodiment, the text of the elements is used to search the one or more index tables for entries.

In step 312, one or more entries may be located in the one or more index tables. In one embodiment, there will be at least one entry located for the page ID in the one or more index tables. In one embodiment, if elements of the page have an associated code, there will be at least one entry located for each code in the one or more index tables. In one embodiment, each entry in the one or more index tables may indicate an occurrence in the one or more documents included in the help database for the insurance claims processing system of the page ID, code, or term included in the index table entry.

In step 314, entries may be located in one or more help tables using information from the entries located in the one or more index tables for the page ID and any elements of the page. The help tables may be substantially similar to the tables illustrated in FIGS. 4 and 5. In one embodiment, each entry in an index table includes an object ID. The one or more help tables may be searched for occurrences of the object ID in each located entry. In one embodiment, the object ID may include information used to determine which help table the object ID is found in. For example, the last two digits of the object ID may indicate if the object ID is an entry for a header table similar to the one illustrated in FIG. 4 or for a text table similar to the one illustrated in FIG. 5. In one embodiment, there may be one entry in the help tables for each object ID. In one embodiment, a particular object ID may be included in one or more entries in an index table.

FIG. 7c illustrates step 306 of FIG. 7a in more detail. In step 306 of FIG. 7a, the context-sensitive help for the page may be displayed. In step 320 of FIG. 7c, the located help table entries may be ranked by relevance. In one embodiment, the entries in the index table may include a relevance value. The located help table entries may be ranked from highest relevance to lowest relevance. Entries with the same relevance may be ranked by any of several methods, including, but not limited to: alphabetic ranking and order of appearance in the index table. In one embodiment, the located help table entries may be listed without ranking for relevance. In one embodiment, any entries found for the page code may be displayed at the top of the list regardless of the relevance ranking of the entry. Entries for other codes in the page may then be ranked below the page code entry or entries in order of relevance.

In step 322, information from the located help table entries may be displayed. In one embodiment, the entries may be displayed in the order of relevance as determined in step 320. The help table entries may include portions of text from one or more documents related to insurance claims processing. Some help table entries may include section headers from the one or more documents. Some help table entries may include text from the bodies of sections of the one or more documents. Some help entries may include glossary information from the one or more documents. Other entries may include text from other portions of the one or more documents. In one embodiment, the relevance value may also be displayed.

In step 324, information describing the location of the displayed portions of text in the one or more documents may be displayed. This information may allow the user to look up (electronically or manually) located occurrences in the one or more documents. The location information may include, but is not limited to: document title, chapter title, and/or number, chapter or section header, section number and/or title, page number, number of occurrences in the section, etc.

In one embodiment, the page display may be split into sections, or panes. In one embodiment, the information from the located help table entries may be displayed in a first pane; the information describing the location in the one or more documents of displayed portions of text may be displayed in a second pane; and the step information may be displayed in a third pane. In one embodiment, separate windows may be used to display the information from the located help table entries, the locations in the one or more documents, and the step information.

Figure 8:
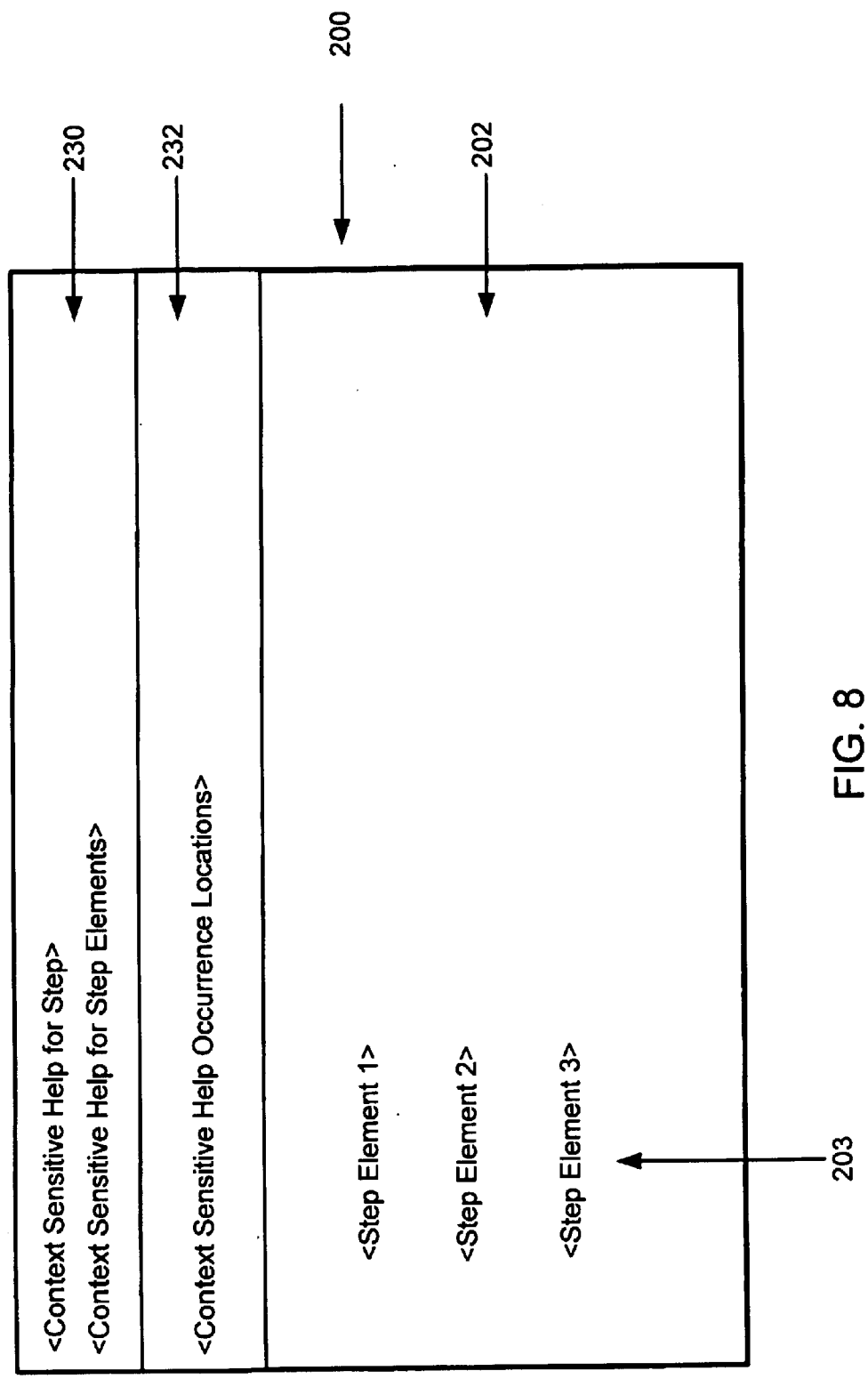
FIG. 8 illustrates a display screen showing multiple panes, wherein two of the panes comprise context sensitive help information, according to one embodiment of an insurance claim processing system.

FIG. 8—A Display Screen Showing Context Sensitive Help Information

FIG. 8 illustrates one embodiment of a display screen 200 showing multiple panes, wherein two of the panes comprise context sensitive help information for a step and the elements of the step. In this embodiment, pane 202 may display a step in the processing of an insurance claim. One or more step elements 203 may be displayed in pane 202. One or more context sensitive help occurrences for the step may be displayed in pane 230. One or more context sensitive help occurrences for the elements in the step may also be displayed in pane 230. Locations for the context sensitive help occurrences displayed in pane 230 may be displayed in pane 232. In one embodiment, a location may be displayed as a chapter hierarchy of the document in which the occurrence is found.

Figure 9:
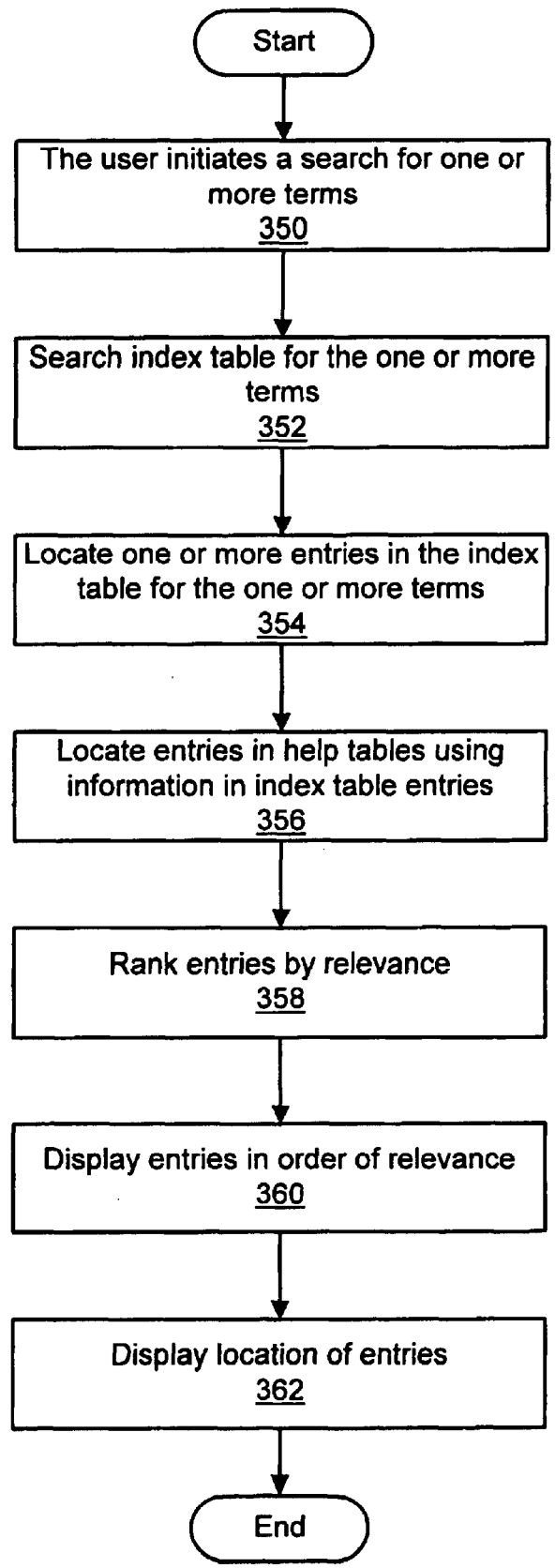
FIG. 9 is a flow diagram illustrating a mechanism for searching for insurance claims processing terms according to one embodiment of an insurance claim processing system.

FIG. 9—A Mechanism for Searching for Insurance Claims Processing Terms

FIG. 9 is a flow diagram illustrating one embodiment of a mechanism for searching for insurance claims processing terms. In one embodiment, the search mechanism may use the same one or more index tables and one or more help tables as are used in the mechanism for providing context sensitive help as described in FIGS. 7a–7c.

A user may first initiate processing of an insurance claim in the insurance claims processing system. The insurance claims processing may begin at a first processing step, and may continue through a number of processing steps until the insurance claim has been processed. A next processing step may be determined by the user input at a current processing step. Each processing step may be displayed to the user in one or more pages on a computer display screen. The claims processing system may enter a processing step and display a page for the processing step.

A search interface may be presented to the user on the display screen. In one embodiment, the search interface may be displayed in response to user action. For example, the user may activate a button or menu item to cause the system to display the search interface. The search interface may be presented in any of various forms. For example, a text entry box may be displayed that accepts one or more terms or phrases to be searched for, and a button may be displayed that initiates a search when activated by the user. The text entry box may also accept special characters, for example, quotation marks around a group of terms that are to be searched for as a phrase. The text entry box may also accept logical operators; for example, an AND operator may be entered between two terms to indicate that help table entries are to be searched for that include both terms.

In step 350, the user may enter in the search interface one or more terms to be searched for in the help database for the insurance claims processing system. The user may then initiate the search for the one or more terms. In step 352, the insurance claims processing system may search the one or more index tables for entries including at least one of the one or more terms.

In step 354, one or more entries may be found in the one or more index tables that include at least one of the one or more terms. In step 356, the located entries in the index table may be used to locate help entries in the one or more help tables that include at least one of the one or more terms. In one embodiment, each entry in an index table includes an object ID. The one or more help tables may be searched for occurrences of the object ID from each of the located entries.

In step 358, the located help table entries may be ranked by relevance. In one embodiment, the entries in the index table may include a relevance value. The located help table entries may be ranked from highest relevance to lowest relevance. Entries with the same relevance may be ranked by any of several methods, including, but not limited to: alphabetic ranking and order of appearance in the index table.

In one embodiment, when there are more than one terms being searched for, located entries may be first ranked on the number of search terms the entries include. Entries that include more search terms may be ranked higher than entries with fewer search terms. For example, if the user enters three terms to be searched for, entries that include all three of the search terms may be ranked first, then entries that include two of the search terms, and finally entries that include just one of the search terms. The entries within the ranking categories may then be ranked by relevance within the category. Thus, entries with lower relevance, but more search terms, may appear higher in the overall ranking than entries with higher relevance, but fewer search terms.

In one embodiment, if there is more than one term being searched for, occurrences including more than one of the search terms may be listed once, rather than listing the occurrence for each search term included in the occurrence. A relevance value of occurrences including more than one search term may be calculated from the relevance value of each of the terms included in the occurrence. For example, if a search is initiated for the terms "Anatomy" and "Body", and the index table 402 illustrated in FIG. 5 is searched, the term "Anatomy" will be located in the third entry in the table, and the term "Body" in the fourth entry. The third and fourth entries have the same object ID 140, indicating that these occurrences are from the same text section. In one embodiment, only one occurrence may be displayed on the display screen for the text section entry in text table 406 indicated by the object ID 140 of entries two and three in index table 402. In one embodiment, the relevance value for an occurrence including more than one term may be calculated using the following method:

Relevance Value=Sum of Occurrence Relevance Values/ Number of Occurrences

Applying this method to the relevance values 152 of the third and fourth entries in index table 402:

(0.28+0.25)/2=0.265

In one embodiment, the calculated relevance value for the occurrence including the two search terms (0.265) may then be rounded to 0.27. In one embodiment, the calculated relevance value may then be used in ranking the occurrence including two terms against other occurrences including two terms.

In step 360, information from the located help table entries may be displayed. In one embodiment, the entries may be displayed in the order of relevance as determined in step 358. The help table entries may include portions of text from one or more documents related to insurance claims processing that include one or more of the one or more search terms. Some help table entries may include section headers from the one or more documents. Some help table entries may include text from the bodies of sections of the one or more documents. Some help entries may include glossary information from the one or more documents. Other entries may include text from other portions of the one or more documents. In one embodiment, the relevance value may also be displayed.

In step 362, information describing the location of the displayed portions of text in the one or more documents may be displayed. This information may allow the user to look up (electronically or manually) located occurrences in the one or more documents. The location information may include, but is not limited to: document title, chapter title, and/or number, chapter or section header, section number and/or title, page number, number of occurrences in the section, etc.

In one embodiment, the page display may be split into sections, or panes. In one embodiment, the information from the located help table entries may be displayed in a first pane; the information describing the location in the one or more documents of displayed portions of text may be displayed in a second pane; and the step information may be displayed in a third pane. In one embodiment, separate windows may be used to display the information from the located help table entries, the locations in the one or more documents, and the step information.

Figure 10:
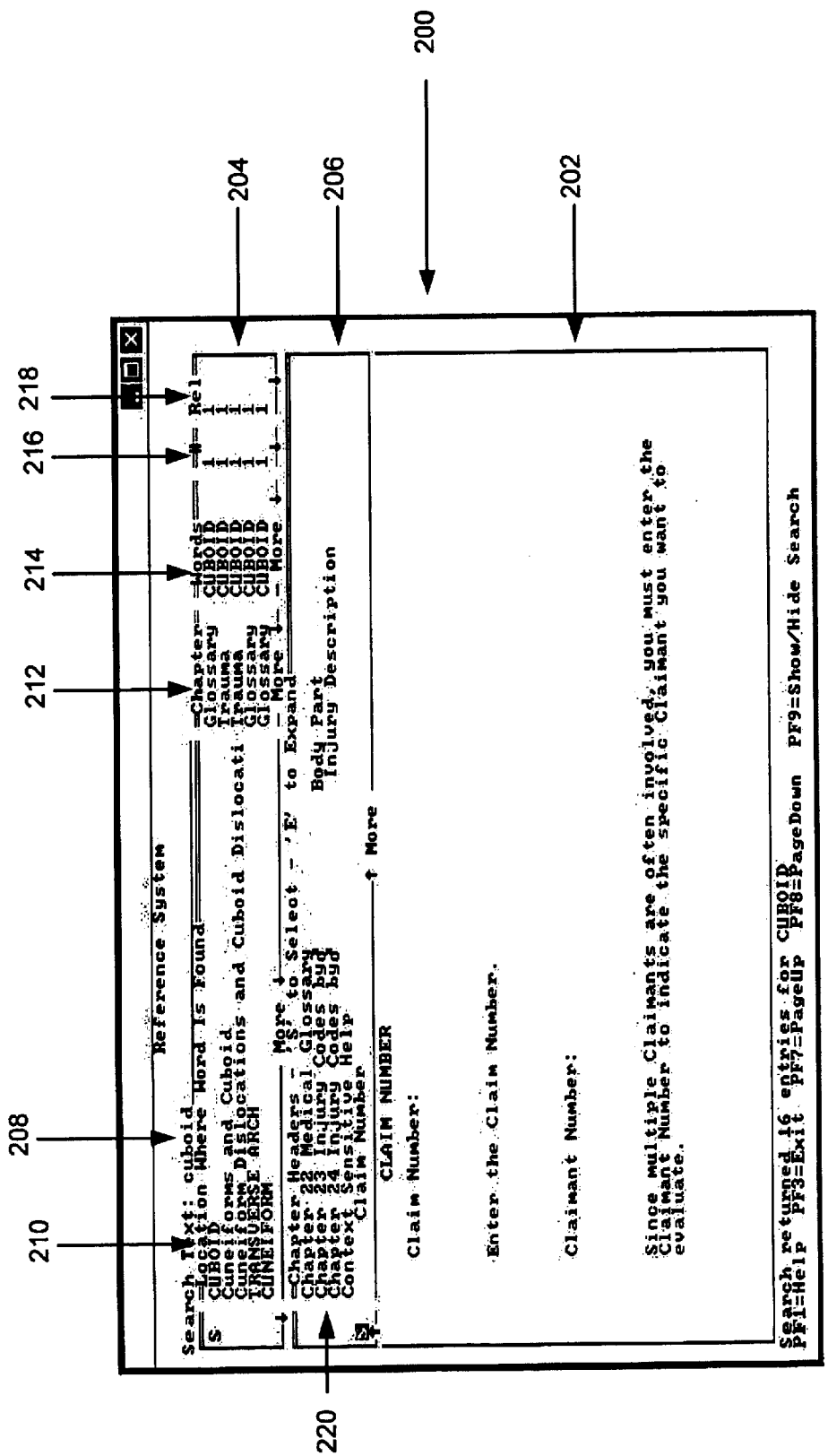
FIG. 10 illustrates a display screen showing multiple panes, wherein two of the panes comprise search results information, according to one embodiment of an insurance claim processing system.

FIG. 10—A Display Screen Showing Search Results Information

FIG. 10 illustrates one embodiment of a display screen 200 showing multiple panes, wherein two of the panes comprise search results information. In this embodiment, pane 202 may display a page for a step in the processing of an insurance claim. The search term "cuboid" 208 has been previously entered by the user, and a search was initiated and completed.

In pane 204, occurrences of the search terms (located entries in the one or more help tables) may be displayed. Column 210 of pane 204 may display a location where the term is found. In one embodiment, a portion or all of a text section or a portion or all of a header from a document may be displayed in column 210. Column 212 may display a portion or all of a chapter or section title of the document where the occurrence is located. Column 214 may list the search term(s) that appear in the occurrence. In this example, only one term 208 was entered. If multiple search terms are entered, then all search terms that appear in a listed occurrence may be listed in column 214. Column 216 may display the number of search terms found in the occurrence. Column 218 may display the relevance value for the entries. In this example, all displayed entries have the same relevance value (1). Other embodiments may include more or fewer columns displaying the same or other information about the occurrences. In one embodiment, not all located entries may be displayed in pane 204. An interface item or items may be provided to the user to display other located entries. Interface items may be items displayed graphically on the screen (for example, icons) and selectable using input/output devices such as a mouse, joystick, or arrow keys on a keyboard. Interface items may also be keyboard selections such as function keys or key combinations. For example, a button may be provided that allows the user to scroll down the list of located entries in pane 204.

In pane 206, information about the location of the occurrences in pane 204 may be displayed. Column 220 may display chapter numbers and/or chapter headers from the one or more documents in the help database that include one or more of the located occurrences displayed in pane 204. In one embodiment, there may be one entry in pane 206 for each entry in pane 204. Alternatively, there may be one entry in pane 206 for each chapter that includes at least one of the occurrences displayed in pane 204. An interface item or items may be provided to allow the user to display entries not currently displayed in pane 206.

Figure 11:
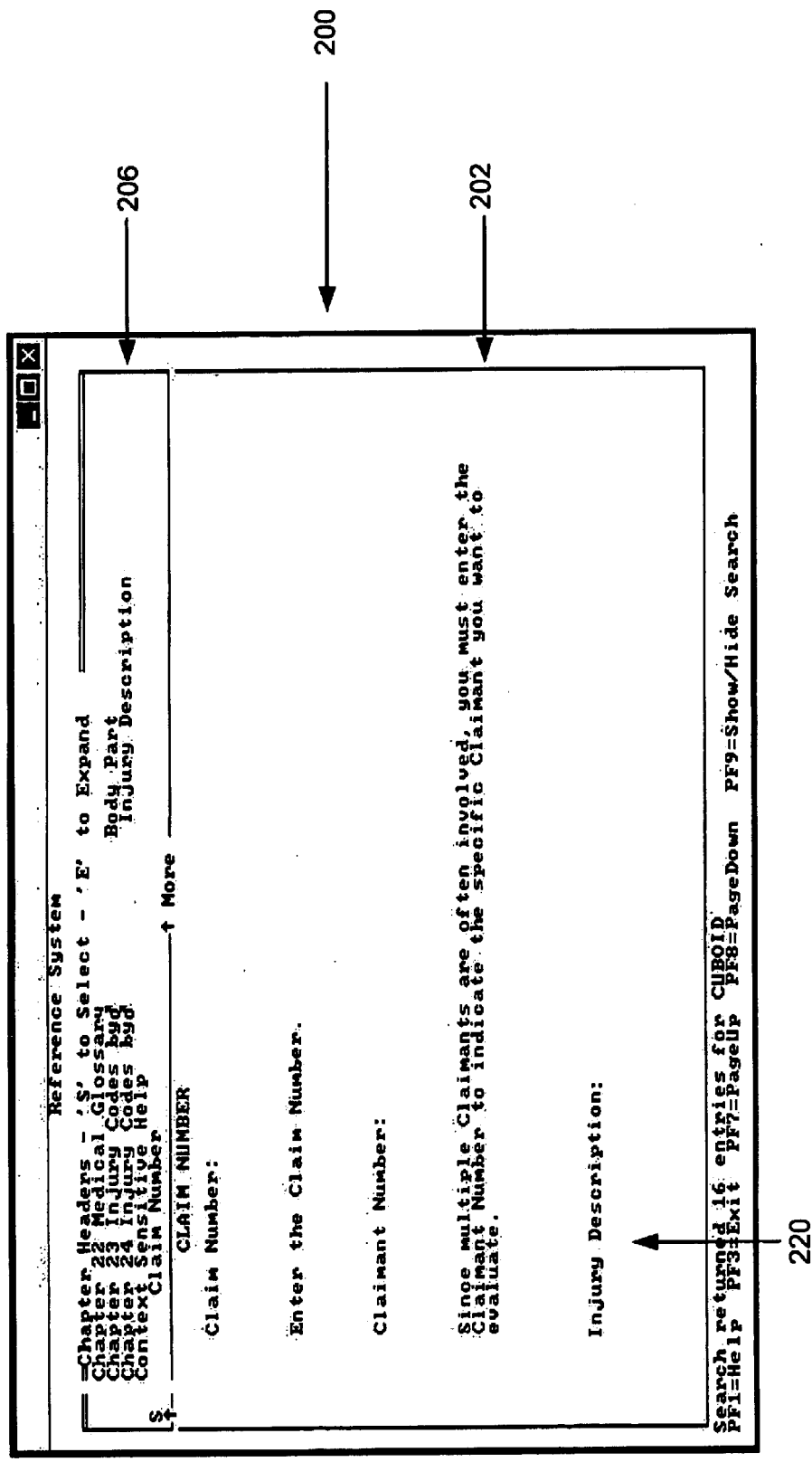
FIG. 11 shows the display screen of FIG. 10, with one of the search results panes hidden to provide more display area for claims processing information, according to one embodiment of an insurance claim processing system.

FIG. 11—Hiding Context-sensitive Help and Search Results Panes

FIG. 11 shows the display screen 200 of FIG. 10, with one of the search results panes (pane 204) hidden to provide more display area for claims processing information. In this embodiment, pane 206 is moved nearer to the top of the display screen than in the display screen illustrated in FIG. 10. Pane 202 displays the page for a step in the processing of an insurance claim. Pane 202 has been expanded to provide more lines for displaying the elements of the step than in the display screen illustrated in FIG. 10. Thus, in this example, pane 202 of FIG. 11 displays the step element "Injury Description" 220 which was hidden in pane 202 of FIG. 10.

An interface item or items may be provided to the user for hiding or showing one or more panes displaying portions of the search results or context-sensitive help. In one embodiment, the interface items may be items displayed graphically on the screen (for example, icons) and may be selectable using input/output devices such as a mouse, joystick, or arrow keys on a keyboard. Interface items may also be keyboard selections such as function keys or key combinations. For example, a function key or key combination may be provided to toggle between hiding and showing pane 204.

The example illustrated in FIG. 11 is of a display with search results. In one embodiment, the hiding and showing of panes as described above may be applied to displays with panes displaying context-sensitive help for a step.

The ability to hide portions of search results or context-sensitive help may be useful in insurance claims processing systems with displays that have a limited amount of display space. For example, displays on some terminals may be limited to 24 lines of text. If the search results are displayed in two panes each using eight lines, hiding one of the panes may double the display space for the step elements from eight to sixteen lines.

Although the system and method of the present invention have been described in connection with several embodiments, the invention is not intended to be limited to the specific forms set forth herein, but on the contrary, it is intended to cover such alternatives, modifications, and equivalents as can be reasonably included within the spirit and scope of the invention as defined by the appended claims.

What is claimed is:

1. A method for displaying reference items in a computer-based insurance claims processing system comprising a display device, the method comprising:

displaying on the display device a display page for a step in processing an insurance claim on the insurance claims processing system;

displaying one or more step elements in a first portion of the display page, wherein a step element comprises one or more interface items for receiving user input in performing the step, and wherein a user of the insurance claims processing system interacts with the step elements in performing the step;

displaying help information for the step in a second portion of the display page;

the user making a first selection of a first interface item displayed on the display device;

reducing a size of the second portion of the display page in response to the user making the first selection of the first interface item; and expanding a size of the first portion of the display page in response to the user making the first selection of the first interface item, wherein the first portion is expanded into a region occupied by the second portion prior to said reducing the size of the second portion.

2. The method of claim 1, wherein said reducing the size of the second portion of the display page removes a portion of the help information from the display page.

3. The method of claim 1, wherein said reducing the size of the second portion of the display page removes substantially all of the help information from the display page.

4. The method of claim 1, further comprising:

displaying one or more additional step elements in the first portion of the display page in response to said expanding the size of the first portion of the display page.

5. The method of claim 1, further comprising:

the user making a second selection of the first interface item on the display device;

reducing the size of the first portion of the display page in response to the user making the second selection of the first interface item; and expanding the size of the second portion of the display page in response to the user making the second selection of the first interface item, wherein the second portion is expanded into a region occupied by the first portion prior to said reducing the size of the first portion.

6. The method of claim 5, further comprising:

removing one or more of the one or more step elements from the first portion of the display page in response to said reducing the size of the first portion of the display page.

7. The method of claim 5, further comprising:

displaying additional help information in the second portion of the display page in response to said expanding the size of the second portion of the display page.

8. A method for displaying reference items in a computer-based insurance claims processing system comprising a display device, the method comprising:

displaying on the display device a display page for a step in processing an insurance claim on the insurance claims processing system;

displaying one or more step elements in a first portion of the display page, wherein a user of the insurance claims processing system interacts with the step elements in performing the step;

displaying help information for the step in a second portion of the display page;

the user selecting a first interface item displayed on the display device;

reducing a size of the first portion of the display page in response to the user selecting the first interface item; and expanding a size of the second portion of the display page in response to the user selecting the first interface item, wherein the second portion is expanded into a region occupied by the first portion prior to said reducing the size of the first portion.

9. The method of claim 8, further comprising:

removing one or more of the one or more step elements from the first portion of the display page in response to said reducing the size of the first portion of the display page.

10. The method of claim 8, further comprising:

displaying additional help information in the second portion of the display page in response to said expanding the size of the second portion of the display page.

11. An insurance claims processing system comprising:

a computer system including a memory medium;

a display device coupled to the computer system;

one or more user input devices coupled to the computer system; and an insurance claims processing program stored in the memory medium and executable within the computer system, wherein the insurance claims processing program is executable to:

display on the display device a display page for a step in processing an insurance claim on the insurance claims processing system;

display one or more step elements in a first portion of the display page, wherein a step element comprises one or more interface items for receiving user input in performing the step, and wherein a user of the insurance claims processing system interacts with the step elements in performing the step;

display help information for the step in a second portion of the display page;

receive a first user input from one of the one or more user input devices, wherein the first user input indicates a user making a first selection of a first interface item on the display;

reduce a size of the second portion of the display page in response to said receiving the first user input; and expand a size of the first portion of the display page in response to said receiving the first user input, wherein the first portion is expanded into a region occupied by the second portion prior to said reducing the size of the second portion.

12. The system of claim 11, wherein, in said reducing the size of the second portion of the display page, the insurance claims processing program is further executable to:

remove a portion of the help information from the display page.

13. The system of claim 11, wherein, in said reducing the size of the second portion of the display page, the insurance claims processing program is further executable to:
   remove substantially all of the help information from the display page.

14. The system of claim 11, wherein the insurance claims processing program is further executable to:
   display one or more additional step elements in the first portion of the display page in response to said expanding the size of the first portion of the display page.

15. The system of claim 11, wherein the insurance claims processing program is further executable to:
   receive a second user input from one of the one or more user input devices, wherein the second user input indicates a user making a second selection of the first interface item on the display;
   reduce the size of the first portion of the display page in response to said receiving the second user input; and
   expand the size of the second portion of the display page in response to said receiving the second user input, wherein the second portion is expanded into a region occupied by the first portion prior to said reducing the size of the first portion.

16. The system of claim 15, wherein the insurance claims processing program is further executable to:
   remove one or more of the one or more step elements from the first portion of the display page in response to said reducing the size of the first portion of the display page.

17. The system of claim 15, wherein the insurance claims processing program is further executable to:
   display additional help information in the second portion of the display page in response to said expanding the size of the second portion of the display page.

18. An insurance claims processing system comprising:
   a computer system including a memory medium;
   a display device coupled to the computer system;
   one or more user input devices coupled to the computer system; and
   an insurance claims processing program stored in the memory medium and executable within the computer system, wherein the insurance claims processing program is executable to:
      display on the display device a display page for a step in processing an insurance claim on the insurance claims processing system;
      display one or more step elements in a first portion of the display page, wherein a step element comprises one or more interface items for receiving user input in performing the step, and wherein a user of the insurance claims processing system interacts with the step elements in performing the step;
      display help information for the step in a second portion of the display page;
      receive a first user input from one of the one or more user input devices, wherein the first user input indicates a user making a first selection of a first interface item on the display;
      reduce a size of the first portion of the display page in response to the user selecting the first interface item; and
      expand a size of the second portion of the display page in response to the user selecting the first interface item, wherein the second portion is expanded into a region occupied by the first portion prior to said reducing the size of the first portion.

19. The system of claim 18, wherein the insurance claims processing program is further executable to:
   remove one or more of the one or more step elements from the first portion of the display page in response to said reducing the size of the first portion of the display page.

20. The system of claim 18, wherein the insurance claims processing program is further executable to:
   display additional help information in the second portion of the display page in response to said expanding the size of the second portion of the display page.

21. A carrier medium comprising program instructions, wherein the program instructions are computer-executable to implement:
   displaying on a display device a display page for a step in processing an insurance claim on a computer-based insurance claims processing system;
   displaying one or more step elements in a first portion of the display page, wherein a step element comprises one or more interface items for receiving user input in performing the step, and wherein a user of the insurance claims processing system interacts with the step elements in performing the step;
   displaying help information for the step in a second portion of the display page;
   the user making a first selection of a first interface item displayed on the display device;
   a size of the second portion of the display page in response to the user making the first selection of the first interface item; and
   expanding a size of the first portion of the display page in response to the user making the first selection of the first interface item, wherein the first portion is expanded into a region occupied by the second portion prior to said reducing the size of the second portion.

22. The carrier medium of claim 21, wherein said reducing the size of the second portion of the display page removes a portion of the help information from the display page.

23. The carrier medium of claim 21, wherein said reducing the size of the second portion of the display page removes substantially all of the help information from the display page.

24. The carrier medium of claim 21, wherein the program instructions are further computer-executable to implement:
   displaying one or more additional step elements in the first portion of the display page in response to said expanding the size of the first portion of the display page.

25. The carrier medium of claim 21, wherein the program instructions are further computer-executable to implement:
   the user making a second selection of the first interface item on the display device;
   reducing the size of the first portion of the display page in response to the user making the second selection of the first interface item; and
   expanding the size of the second portion of the display page in response to the user making the second selection of the first interface item, wherein the second portion is expanded into a region occupied by the first portion prior to said reducing the size of the first portion.

26. The carrier medium of claim 25, wherein the program instructions are further computer-executable to implement:

removing one or more of the one or more step elements from the first portion of the display page in response to said reducing the size of the first portion of the display page.

27. The carrier medium of claim 25, wherein the program instructions are further computer-executable to implement:

displaying additional help information in the second portion of the display page in response to said expanding the size of the second portion of the display page.

28. A carrier medium comprising program instructions, wherein the program instructions are computer-executable to implement:

displaying on a display device a display page for a step in processing an insurance claim on a computer-based insurance claims processing system;

displaying one or more step elements in a first portion of the display page, wherein a user of the insurance claims processing system interacts with the step elements in performing the step;

displaying help information for the step in a second portion of the display page;

the user selecting a first interface item displayed on the display device;

reducing a size of the first portion of the display page in response to the user selecting the first interface item; and expanding a size of the second portion of the display page in response to the user selecting the first interface item, wherein the second portion is expanded into a region occupied by the first portion prior to said reducing the size of the first portion.

29. The carrier medium of claim 28, wherein the program instructions are further computer-executable to implement:

removing one or more of the one or more step elements from the first portion of the display page in response to said reducing the size of the first portion of the display page.

30. The carrier medium of claim 28, wherein the program instructions are further computer-executable to implement:

displaying additional help information in the second portion of the display page in response to said expanding the size of the second portion of the display page.

* * * * *